(12) United States Patent
Large

(10) Patent No.: US 9,201,185 B2
(45) Date of Patent: Dec. 1, 2015

(54) DIRECTIONAL BACKLIGHTING FOR DISPLAY PANELS

(75) Inventor: Timothy Large, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 104 days.

(21) Appl. No.: 13/021,448

(22) Filed: Feb. 4, 2011

(65) Prior Publication Data

US 2012/0200802 A1     Aug. 9, 2012

(51) Int. Cl.
*F21V 8/00*     (2006.01)

(52) U.S. Cl.
CPC ............ *G02B 6/0046* (2013.01); *G02B 6/0068* (2013.01); *G02B 6/0055* (2013.01); *G02B 6/0073* (2013.01)

(58) Field of Classification Search
CPC ... G02B 6/0046; G02B 6/0055; G02B 6/0068
USPC ......... 349/56, 57, 61, 62, 65, 67, 95, 201, 66; 362/97.1, 97.2, 97.3, 97.4, 611, 610, 362/600, 516, 196.1, 215, 518, 615–629, 362/612; 359/641, 201.2; 345/84; 385/1, 2, 385/3, 31, 36, 14, 39, 42, 43, 129, 130, 131, 385/133, 146, 901, 27
See application file for complete search history.

(56) References Cited

U.S. PATENT DOCUMENTS

| | | | |
|---|---|---|---|
| 4,046,975 A | 9/1977 | Seeger, Jr. | |
| 4,065,649 A | 12/1977 | Carter et al. | |
| 4,243,861 A | 1/1981 | Strandwitz | |
| 4,302,648 A | 11/1981 | Sado et al. | |
| 4,317,013 A | 2/1982 | Larson | |
| 4,365,130 A | 12/1982 | Christensen | |
| 4,492,829 A | 1/1985 | Rodrique | |

(Continued)

FOREIGN PATENT DOCUMENTS

| CN | 1515937 A | 7/2004 |
|---|---|---|
| CN | 1650202 A | 8/2005 |

(Continued)

OTHER PUBLICATIONS

"Optics for Displays: Waveguide-based wedge creates collimated display backlight", Retrieved at << http://www.optoiq.com/index/photonics-technologies-applications/lfw-display/lfw-article-display.articles.laser-focus-world.volume-46.issue-1.world-news.optics-for_displays.html>>, Jan. 1, 2010, pp. 3.

(Continued)

*Primary Examiner* — Richard Kim
*Assistant Examiner* — Kendrick Hsu
(74) *Attorney, Agent, or Firm* — Brandon Roper; Judy Yee; Micky Minhas

(57) ABSTRACT

Various embodiments are disclosed that relate to display panel backlight systems that output light with a narrower angular intensity distribution than a diffuse backlight. For example, one disclosed embodiment provides a backlight system comprising a wedge-shaped light guide comprising a thin end and a thick end, the thick end of the wedge-shaped light guide comprising a linear reflector with plurality of facets, and wherein the backlight system also comprises a plurality of light sources arranged along the thin end of the wedge-shaped light guide.

17 Claims, 11 Drawing Sheets

(56) References Cited

U.S. PATENT DOCUMENTS

| | | |
|---|---|---|
| 4,527,021 A | 7/1985 | Morikawa et al. |
| 4,559,426 A | 12/1985 | Van Zeeland et al. |
| 4,588,187 A | 5/1986 | Dell |
| 4,607,147 A | 8/1986 | Ono et al. |
| 4,651,133 A | 3/1987 | Ganesan et al. |
| 4,735,495 A | 4/1988 | Henkes |
| 5,220,521 A | 6/1993 | Kikinis |
| 5,283,559 A | 2/1994 | Kalendra et al. |
| 5,319,455 A | 6/1994 | Hoarty et al. |
| 5,331,443 A | 7/1994 | Stanisci |
| 5,548,477 A | 8/1996 | Kumar et al. |
| 5,558,577 A | 9/1996 | Kato |
| 5,618,232 A | 4/1997 | Martin |
| 5,681,220 A | 10/1997 | Bertram et al. |
| 5,745,376 A | 4/1998 | Barker et al. |
| 5,748,114 A | 5/1998 | Koehn |
| 5,781,406 A | 7/1998 | Hunte |
| 5,806,955 A | 9/1998 | Parkyn, Jr. et al. |
| 5,807,175 A | 9/1998 | Davis et al. |
| 5,808,713 A | 9/1998 | Broer et al. |
| 5,818,361 A | 10/1998 | Acevedo |
| 5,828,770 A | 10/1998 | Leis et al. |
| 5,838,403 A | 11/1998 | Jannson et al. |
| 5,874,697 A | 2/1999 | Selker et al. |
| 5,921,652 A | 7/1999 | Parker et al. |
| 5,926,170 A | 7/1999 | Oba |
| 5,967,637 A | 10/1999 | Ishikawa et al. |
| 5,971,635 A | 10/1999 | Wise |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,061,644 A | 5/2000 | Leis |
| 6,072,551 A | 6/2000 | Jannson et al. |
| 6,112,797 A | 9/2000 | Colson et al. |
| 6,124,906 A | 9/2000 | Kawada et al. |
| 6,129,444 A | 10/2000 | Tognoni |
| 6,172,807 B1 | 1/2001 | Akamatsu |
| 6,178,443 B1 | 1/2001 | Lin |
| 6,215,590 B1 | 4/2001 | Okano |
| 6,254,105 B1 | 7/2001 | Rinde et al. |
| 6,256,447 B1 | 7/2001 | Laine |
| 6,279,060 B1 | 8/2001 | Luke et al. |
| 6,329,617 B1 | 12/2001 | Burgess |
| 6,344,791 B1 | 2/2002 | Armstrong |
| 6,380,497 B1 | 4/2002 | Hashimoto et al. |
| 6,437,682 B1 | 8/2002 | Vance |
| 6,511,378 B1 | 1/2003 | Bhatt et al. |
| 6,529,179 B1 | 3/2003 | Hashimoto et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,597,347 B1 | 7/2003 | Yasutake |
| 6,600,121 B1 | 7/2003 | Olodort et al. |
| 6,603,408 B1 | 8/2003 | Gaba |
| 6,617,536 B2 | 9/2003 | Kawaguchi |
| 6,648,485 B1 | 11/2003 | Colgan et al. |
| 6,685,369 B2 | 2/2004 | Lien |
| 6,704,864 B1 | 3/2004 | Philyaw |
| 6,721,019 B2 | 4/2004 | Kono et al. |
| 6,725,318 B1 | 4/2004 | Sherman et al. |
| 6,774,888 B1 | 8/2004 | Genduso |
| 6,776,546 B2 | 8/2004 | Kraus et al. |
| 6,784,869 B1 | 8/2004 | Clark et al. |
| 6,813,143 B2 | 11/2004 | Makela |
| 6,819,316 B2 | 11/2004 | Schulz et al. |
| 6,856,506 B2 | 2/2005 | Doherty et al. |
| 6,861,961 B2 | 3/2005 | Sandbach et al. |
| 6,867,828 B2 | 3/2005 | Taira et al. |
| 6,870,671 B2 | 3/2005 | Travis |
| 6,895,164 B2 | 5/2005 | Saccomanno |
| 6,898,315 B2 | 5/2005 | Guha |
| 6,914,197 B2 | 7/2005 | Doherty et al. |
| 6,950,950 B2 | 9/2005 | Sawyers et al. |
| 6,970,957 B1 | 11/2005 | Oshins et al. |
| 6,976,799 B2 | 12/2005 | Kim et al. |
| 6,980,177 B2 | 12/2005 | Struyk |
| 6,981,792 B2 | 1/2006 | Nagakubo et al. |
| 7,051,149 B2 | 5/2006 | Wang et al. |
| 7,073,933 B2 | 7/2006 | Gotoh et al. |
| 7,083,295 B1 | 8/2006 | Hanna |
| 7,091,436 B2 | 8/2006 | Serban |
| 7,104,679 B2 | 9/2006 | Shin et al. |
| 7,106,222 B2 | 9/2006 | Ward et al. |
| 7,123,292 B1 | 10/2006 | Seeger et al. |
| 7,151,635 B2 | 12/2006 | Bidnyk et al. |
| 7,153,017 B2 | 12/2006 | Yamashita et al. |
| 7,194,662 B2 | 3/2007 | Do et al. |
| 7,213,991 B2 | 5/2007 | Chapman et al. |
| 7,224,830 B2 | 5/2007 | Nefian et al. |
| 7,260,823 B2 | 8/2007 | Schlack et al. |
| 7,277,087 B2 | 10/2007 | Hill et al. |
| 7,364,343 B2 | 4/2008 | Keuper et al. |
| 7,370,342 B2 | 5/2008 | Ismail et al. |
| 7,374,312 B2 | 5/2008 | Feng et al. |
| 7,375,885 B2 | 5/2008 | Ijzerman et al. |
| 7,384,178 B2 | 6/2008 | Sumida et al. |
| 7,400,377 B2 | 7/2008 | Evans et al. |
| 7,400,817 B2 | 7/2008 | Lee et al. |
| 7,410,286 B2 | 8/2008 | Travis |
| 7,431,489 B2 | 10/2008 | Yeo et al. |
| 7,447,934 B2 | 11/2008 | Dasari et al. |
| 7,469,386 B2 | 12/2008 | Bear et al. |
| 7,499,037 B2 | 3/2009 | Lube |
| 7,502,803 B2 | 3/2009 | Culter et al. |
| 7,503,684 B2 | 3/2009 | Ueno et al. |
| 7,528,374 B2 | 5/2009 | Smitt et al. |
| 7,542,052 B2 | 6/2009 | Solomon et al. |
| 7,545,429 B2 | 6/2009 | Travis |
| 7,558,594 B2 | 7/2009 | Wilson |
| 7,559,834 B1 | 7/2009 | York |
| 7,572,045 B2 | 8/2009 | Hoelen et al. |
| RE40,891 E | 9/2009 | Yasutake |
| 7,631,327 B2 | 12/2009 | Dempski et al. |
| 7,636,921 B2 | 12/2009 | Louie |
| 7,639,876 B2 | 12/2009 | Clary et al. |
| 7,656,392 B2 | 2/2010 | Bolender |
| 7,660,047 B1 * | 2/2010 | Travis et al. ............... 359/726 |
| 7,675,598 B2 | 3/2010 | Hong |
| 7,728,923 B2 | 6/2010 | Kim et al. |
| 7,733,326 B1 | 6/2010 | Adiseshan |
| 7,773,076 B2 | 8/2010 | Pittel et al. |
| 7,773,121 B1 | 8/2010 | Huntsberger et al. |
| 7,774,155 B2 | 8/2010 | Sato et al. |
| 7,777,972 B1 | 8/2010 | Chen et al. |
| 7,782,341 B2 | 8/2010 | Kothandaraman |
| 7,782,342 B2 | 8/2010 | Koh |
| 7,813,715 B2 | 10/2010 | McKillop et al. |
| 7,815,358 B2 | 10/2010 | Inditsky |
| 7,844,985 B2 | 11/2010 | Hendricks et al. |
| 7,884,807 B2 | 2/2011 | Hovden et al. |
| D636,397 S | 4/2011 | Green |
| 7,928,964 B2 | 4/2011 | Kolmykov-Zotov et al. |
| 7,936,501 B2 | 5/2011 | Smith et al. |
| 7,945,717 B2 | 5/2011 | Rivalsi |
| 7,957,082 B2 | 6/2011 | Mi et al. |
| 7,965,268 B2 | 6/2011 | Gass et al. |
| 7,970,246 B2 * | 6/2011 | Travis et al. ............... 385/43 |
| 7,973,771 B2 | 7/2011 | Geaghan |
| 7,978,281 B2 | 7/2011 | Vergith et al. |
| 7,991,257 B1 | 8/2011 | Coleman |
| 8,007,158 B2 * | 8/2011 | Woo et al. ............... 362/612 |
| 8,018,579 B1 | 9/2011 | Krah |
| 8,053,688 B2 | 11/2011 | Conzola et al. |
| 8,065,624 B2 | 11/2011 | Morin et al. |
| 8,069,356 B2 | 11/2011 | Rathi et al. |
| 8,098,233 B2 | 1/2012 | Hotelling et al. |
| 8,115,499 B2 | 2/2012 | Osoinach et al. |
| 8,130,203 B2 | 3/2012 | Westerman |
| 8,149,272 B2 | 4/2012 | Evans et al. |
| 8,154,524 B2 | 4/2012 | Wilson et al. |
| D659,139 S | 5/2012 | Gengler |
| 8,169,421 B2 | 5/2012 | Wright et al. |

(56) References Cited

U.S. PATENT DOCUMENTS

| | | | |
|---|---|---|---|
| 8,189,973 B2* | 5/2012 | Travis et al. ..................... 385/43 |
| 8,229,509 B2 | 7/2012 | Paek et al. |
| 8,229,522 B2 | 7/2012 | Kim et al. |
| 8,251,563 B2 | 8/2012 | Papakonstantinou et al. |
| 8,310,508 B2 | 11/2012 | Hekstra et al. |
| 8,325,416 B2 | 12/2012 | Lesage et al. |
| 8,354,806 B2 | 1/2013 | Travis et al. |
| 8,362,975 B2 | 1/2013 | Uehara |
| 8,466,954 B2 | 6/2013 | Ko et al. |
| 8,467,133 B2 | 6/2013 | Miller |
| 8,548,608 B2 | 10/2013 | Perek et al. |
| 8,565,560 B2 | 10/2013 | Popovich et al. |
| 2002/0008854 A1 | 1/2002 | Travis |
| 2002/0134828 A1 | 9/2002 | Sandbach et al. |
| 2003/0137821 A1 | 7/2003 | Gotoh et al. |
| 2003/0197687 A1 | 10/2003 | Shetter |
| 2004/0258924 A1 | 12/2004 | Berger et al. |
| 2004/0268000 A1 | 12/2004 | Barker et al. |
| 2005/0057515 A1 | 3/2005 | Bathiche |
| 2005/0059489 A1 | 3/2005 | Kim |
| 2005/0146512 A1 | 7/2005 | Hill et al. |
| 2005/0264653 A1 | 12/2005 | Starkweather et al. |
| 2005/0264988 A1 | 12/2005 | Nicolosi |
| 2005/0285703 A1 | 12/2005 | Wheeler et al. |
| 2006/0012767 A1 | 1/2006 | Komatsuda et al. |
| 2006/0028838 A1* | 2/2006 | Imade ............................ 362/602 |
| 2006/0083004 A1 | 4/2006 | Cok |
| 2006/0085658 A1 | 4/2006 | Allen et al. |
| 2006/0102914 A1* | 5/2006 | Smits et al. ....................... 257/98 |
| 2006/0125799 A1 | 6/2006 | Hillis et al. |
| 2006/0132423 A1 | 6/2006 | Travis et al. |
| 2006/0146573 A1 | 7/2006 | Iwauchi et al. |
| 2006/0154725 A1 | 7/2006 | Glaser et al. |
| 2006/0156415 A1 | 7/2006 | Rubinstein et al. |
| 2006/0181514 A1 | 8/2006 | Newman |
| 2006/0187216 A1 | 8/2006 | Trent, Jr. et al. |
| 2006/0195522 A1 | 8/2006 | Miyazaki |
| 2006/0215244 A1 | 9/2006 | Yosha et al. |
| 2006/0262185 A1 | 11/2006 | Cha et al. |
| 2006/0287982 A1 | 12/2006 | Sheldon et al. |
| 2007/0046625 A1 | 3/2007 | Yee |
| 2007/0047221 A1* | 3/2007 | Park ................................ 362/97 |
| 2007/0062089 A1 | 3/2007 | Homer et al. |
| 2007/0072474 A1 | 3/2007 | Beasley et al. |
| 2007/0076434 A1* | 4/2007 | Uehara et al. .................. 362/616 |
| 2007/0080813 A1 | 4/2007 | Melvin |
| 2007/0091638 A1 | 4/2007 | Ijzerman et al. |
| 2007/0182663 A1 | 8/2007 | Biech |
| 2007/0182722 A1 | 8/2007 | Hotelling et al. |
| 2007/0201246 A1 | 8/2007 | Yeo et al. |
| 2007/0217224 A1* | 9/2007 | Kao et al. ....................... 362/615 |
| 2007/0234420 A1 | 10/2007 | Novotney et al. |
| 2007/0236408 A1 | 10/2007 | Yamaguchi et al. |
| 2007/0236475 A1 | 10/2007 | Wherry |
| 2007/0247432 A1 | 10/2007 | Oakley |
| 2007/0260892 A1 | 11/2007 | Paul et al. |
| 2007/0274094 A1* | 11/2007 | Schultz et al. ................. 362/601 |
| 2007/0274095 A1* | 11/2007 | Destain ........................ 362/609 |
| 2007/0274099 A1 | 11/2007 | Tai et al. |
| 2007/0283179 A1 | 12/2007 | Burnett et al. |
| 2008/0005423 A1 | 1/2008 | Jacobs et al. |
| 2008/0013809 A1 | 1/2008 | Zhu et al. |
| 2008/0019150 A1* | 1/2008 | Park et al. ...................... 362/621 |
| 2008/0037284 A1* | 2/2008 | Rudisill ........................ 362/629 |
| 2008/0104437 A1 | 5/2008 | Lee |
| 2008/0151478 A1 | 6/2008 | Chern |
| 2008/0158185 A1 | 7/2008 | Westerman |
| 2008/0211787 A1 | 9/2008 | Nakao et al. |
| 2008/0219025 A1* | 9/2008 | Spitzer et al. .................. 362/609 |
| 2008/0238884 A1 | 10/2008 | Harish |
| 2008/0253822 A1 | 10/2008 | Matias |
| 2008/0309636 A1 | 12/2008 | Feng et al. |
| 2008/0316002 A1 | 12/2008 | Brunet et al. |
| 2008/0316768 A1 | 12/2008 | Travis |
| 2008/0320190 A1 | 12/2008 | Lydon et al. |
| 2009/0009476 A1 | 1/2009 | Daley, III |
| 2009/0040426 A1 | 2/2009 | Mather et al. |
| 2009/0073957 A1 | 3/2009 | Newland et al. |
| 2009/0140985 A1 | 6/2009 | Liu |
| 2009/0146992 A1 | 6/2009 | Fukunaga et al. |
| 2009/0152748 A1 | 6/2009 | Wang et al. |
| 2009/0161385 A1* | 6/2009 | Parker et al. .................. 362/618 |
| 2009/0195497 A1 | 8/2009 | Fitzgerald et al. |
| 2009/0231275 A1 | 9/2009 | Odgers |
| 2009/0251008 A1 | 10/2009 | Sugaya |
| 2009/0262492 A1 | 10/2009 | Whitchurch et al. |
| 2009/0265670 A1 | 10/2009 | Kim et al. |
| 2009/0303204 A1 | 12/2009 | Nasiri et al. |
| 2009/0316072 A1* | 12/2009 | Okumura et al. ............... 349/64 |
| 2009/0320244 A1 | 12/2009 | Lin |
| 2009/0321490 A1 | 12/2009 | Groene et al. |
| 2010/0001963 A1 | 1/2010 | Doray et al. |
| 2010/0026656 A1 | 2/2010 | Hotelling et al. |
| 2010/0038821 A1 | 2/2010 | Jenkins et al. |
| 2010/0045609 A1 | 2/2010 | Do et al. |
| 2010/0045633 A1 | 2/2010 | Gettemy et al. |
| 2010/0051356 A1 | 3/2010 | Stern et al. |
| 2010/0051432 A1 | 3/2010 | Lin et al. |
| 2010/0053534 A1 | 3/2010 | Hsieh et al. |
| 2010/0077237 A1 | 3/2010 | Sawyers |
| 2010/0079861 A1 | 4/2010 | Powell |
| 2010/0081377 A1 | 4/2010 | Chatterjee et al. |
| 2010/0085321 A1 | 4/2010 | Pundsack |
| 2010/0103112 A1 | 4/2010 | Yoo et al. |
| 2010/0123686 A1 | 5/2010 | Klinghult et al. |
| 2010/0135036 A1* | 6/2010 | Matsuba et al. ............... 362/516 |
| 2010/0149111 A1 | 6/2010 | Olien |
| 2010/0149134 A1 | 6/2010 | Westerman et al. |
| 2010/0156798 A1 | 6/2010 | Archer |
| 2010/0161522 A1 | 6/2010 | Tirpak et al. |
| 2010/0164857 A1 | 7/2010 | Liu et al. |
| 2010/0171891 A1 | 7/2010 | Kaji et al. |
| 2010/0174421 A1 | 7/2010 | Tsai et al. |
| 2010/0180063 A1 | 7/2010 | Ananny et al. |
| 2010/0188299 A1 | 7/2010 | Rinehart et al. |
| 2010/0206614 A1 | 8/2010 | Park et al. |
| 2010/0214257 A1 | 8/2010 | Wussler et al. |
| 2010/0222110 A1 | 9/2010 | Kim et al. |
| 2010/0231498 A1 | 9/2010 | Large et al. |
| 2010/0231510 A1 | 9/2010 | Sampsell et al. |
| 2010/0231556 A1 | 9/2010 | Mines et al. |
| 2010/0238138 A1 | 9/2010 | Goertz et al. |
| 2010/0250988 A1 | 9/2010 | Okuda et al. |
| 2010/0274932 A1 | 10/2010 | Kose |
| 2010/0279768 A1 | 11/2010 | Huang et al. |
| 2010/0289457 A1 | 11/2010 | Onnerud et al. |
| 2010/0295812 A1 | 11/2010 | Burns et al. |
| 2010/0302378 A1 | 12/2010 | Marks et al. |
| 2010/0304793 A1 | 12/2010 | Kim et al. |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315348 A1 | 12/2010 | Jellicoe et al. |
| 2010/0321339 A1 | 12/2010 | Kimmel |
| 2010/0325155 A1 | 12/2010 | Skinner et al. |
| 2010/0331059 A1 | 12/2010 | Apgar et al. |
| 2011/0012873 A1 | 1/2011 | Prest et al. |
| 2011/0019123 A1 | 1/2011 | Prest et al. |
| 2011/0031287 A1 | 2/2011 | Le Gette et al. |
| 2011/0037721 A1 | 2/2011 | Cranfill et al. |
| 2011/0043142 A1 | 2/2011 | Travis et al. |
| 2011/0043990 A1 | 2/2011 | Mickey et al. |
| 2011/0044582 A1* | 2/2011 | Travis et al. ..................... 385/43 |
| 2011/0060926 A1 | 3/2011 | Brooks et al. |
| 2011/0069148 A1 | 3/2011 | Jones et al. |
| 2011/0074688 A1 | 3/2011 | Hull et al. |
| 2011/0102326 A1 | 5/2011 | Casparian et al. |
| 2011/0102356 A1 | 5/2011 | Kemppinen et al. |
| 2011/0115747 A1 | 5/2011 | Powell et al. |
| 2011/0134032 A1 | 6/2011 | Chiu et al. |
| 2011/0134112 A1 | 6/2011 | Koh et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |

(56) References Cited

U.S. PATENT DOCUMENTS

| | | | |
|---|---|---|---|
| 2011/0167287 A1 | 7/2011 | Walsh et al. | |
| 2011/0167391 A1 | 7/2011 | Momeyer et al. | |
| 2011/0167992 A1 | 7/2011 | Eventoff et al. | |
| 2011/0179864 A1 | 7/2011 | Raasch et al. | |
| 2011/0184646 A1 | 7/2011 | Wong et al. | |
| 2011/0193787 A1 | 8/2011 | Morishige et al. | |
| 2011/0193938 A1 | 8/2011 | Oderwald et al. | |
| 2011/0202878 A1 | 8/2011 | Park et al. | |
| 2011/0205372 A1 | 8/2011 | Miramontes | |
| 2011/0216266 A1* | 9/2011 | Travis | 349/62 |
| 2011/0227913 A1 | 9/2011 | Hyndman | |
| 2011/0242138 A1 | 10/2011 | Tribble | |
| 2011/0242298 A1 | 10/2011 | Bathiche et al. | |
| 2011/0248152 A1 | 10/2011 | Svajda et al. | |
| 2011/0248920 A1 | 10/2011 | Larsen | |
| 2011/0261083 A1 | 10/2011 | Wilson | |
| 2011/0290686 A1 | 12/2011 | Huang | |
| 2011/0295697 A1 | 12/2011 | Boston et al. | |
| 2011/0297566 A1 | 12/2011 | Gallagher et al. | |
| 2011/0304577 A1 | 12/2011 | Brown et al. | |
| 2011/0316807 A1 | 12/2011 | Corrion | |
| 2012/0007821 A1 | 1/2012 | Zaliva | |
| 2012/0011462 A1 | 1/2012 | Westerman et al. | |
| 2012/0020112 A1* | 1/2012 | Fisher et al. | 362/608 |
| 2012/0023459 A1 | 1/2012 | Westerman | |
| 2012/0024682 A1 | 2/2012 | Huang et al. | |
| 2012/0044179 A1 | 2/2012 | Hudson | |
| 2012/0047368 A1 | 2/2012 | Chinn et al. | |
| 2012/0050975 A1 | 3/2012 | Garelli et al. | |
| 2012/0075249 A1 | 3/2012 | Hoch | |
| 2012/0081316 A1 | 4/2012 | Sirpal et al. | |
| 2012/0092279 A1 | 4/2012 | Martin | |
| 2012/0094257 A1 | 4/2012 | Pillischer et al. | |
| 2012/0099749 A1 | 4/2012 | Rubin et al. | |
| 2012/0117409 A1 | 5/2012 | Lee et al. | |
| 2012/0127118 A1 | 5/2012 | Nolting et al. | |
| 2012/0127573 A1 | 5/2012 | Robinson et al. | |
| 2012/0140396 A1 | 6/2012 | Zeliff et al. | |
| 2012/0145525 A1 | 6/2012 | Ishikawa | |
| 2012/0162693 A1 | 6/2012 | Ito | |
| 2012/0182242 A1 | 7/2012 | Lindahl et al. | |
| 2012/0188791 A1 | 7/2012 | Voloschenko et al. | |
| 2012/0194448 A1 | 8/2012 | Rothkopf | |
| 2012/0195063 A1* | 8/2012 | Kim et al. | 362/602 |
| 2012/0200802 A1 | 8/2012 | Large | |
| 2012/0206937 A1* | 8/2012 | Travis et al. | 362/602 |
| 2012/0224073 A1 | 9/2012 | Miyahara | |
| 2012/0246377 A1 | 9/2012 | Bhesania et al. | |
| 2012/0256959 A1 | 10/2012 | Ye et al. | |
| 2012/0274811 A1 | 11/2012 | Bakin | |
| 2012/0300275 A1 | 11/2012 | Vilardell et al. | |
| 2013/0063873 A1 | 3/2013 | Wodrich et al. | |
| 2013/0106766 A1 | 5/2013 | Yilmaz et al. | |
| 2013/0120466 A1 | 5/2013 | Chen et al. | |
| 2013/0127980 A1 | 5/2013 | Haddick et al. | |
| 2013/0155723 A1 | 6/2013 | Coleman | |
| 2013/0207937 A1 | 8/2013 | Lutian et al. | |
| 2013/0229335 A1 | 9/2013 | Whitman et al. | |
| 2013/0232280 A1 | 9/2013 | Perek et al. | |
| 2013/0308339 A1 | 11/2013 | Woodgate et al. | |

FOREIGN PATENT DOCUMENTS

| | | |
|---|---|---|
| CN | 1700072 A | 11/2005 |
| CN | 1920642 A | 2/2007 |
| CN | 101038401 A | 9/2007 |
| CN | 101473167 A | 7/2009 |
| CN | 101512403 A | 8/2009 |
| CN | 101688991 A | 3/2010 |
| CN | 101889225 A | 11/2010 |
| CN | 101893785 A | 11/2010 |
| EP | 2353978 A1 | 8/2011 |
| GB | 2410116 A | 7/2005 |
| GB | 2428101 A | 1/2007 |
| JP | H07218865 A | 8/1995 |
| JP | H0980354 A | 3/1997 |
| JP | H09178949 A | 7/1997 |
| JP | 410326124 A | 12/1998 |
| JP | 2000106021 A | 4/2000 |
| JP | 2002100226 A | 4/2002 |
| JP | 2002162912 A | 6/2002 |
| JP | 2003215349 A | 7/2003 |
| JP | 2004171948 A | 6/2004 |
| JP | 2005077437 A | 3/2005 |
| JP | 2005156932 A | 6/2005 |
| JP | 2005331565 A | 12/2005 |
| JP | 2006004877 A | 1/2006 |
| JP | 2006278251 A | 10/2006 |
| JP | 2006294361 A | 10/2006 |
| JP | 2006310269 A | 11/2006 |
| JP | 2007184286 A | 7/2007 |
| JP | 2007273288 A | 10/2007 |
| JP | 2008066152 A | 3/2008 |
| JP | 2008529251 A | 7/2008 |
| JP | 2008286874 A | 11/2008 |
| JP | 2009059583 A | 3/2009 |
| JP | 2010151951 A | 7/2010 |
| KR | 20010039013 A | 5/2001 |
| KR | 20080009490 A | 1/2008 |
| KR | 20080055051 A | 6/2008 |
| WO | 0172037 A1 | 9/2001 |
| WO | 03048635 A1 | 6/2003 |
| WO | 03083530 A1 | 9/2003 |
| WO | 2005059874 A1 | 6/2005 |
| WO | 2006044818 A1 | 4/2006 |
| WO | 2006082444 A2 | 8/2006 |
| WO | 2007094304 A1 | 8/2007 |
| WO | 2007123202 A1 | 11/2007 |
| WO | 2008013146 A1 | 1/2008 |
| WO | 2008038016 A1 | 4/2008 |
| WO | 2012174364 A2 | 12/2012 |
| WO | 2013033274 A1 | 3/2013 |
| WO | 2013163347 A1 | 10/2013 |

OTHER PUBLICATIONS

Travis, et al., "Collimated light from a waveguide for a display backlight", Retrieved at << http://download.microsoft.com/download/D/2/E/D2E425F8-CF3C-4C71-A4A2-70F9D4081007/OpticsExpressbacklightpaper.pdf >>, Oct. 15, 2009, pp. 6.

Travis, et al., "The design of backlights for view-sequential 3D", Retrieved at << http://download.microsoft.com/download/D/2/E/D2E425F8-CF3C-4C71-A4A2-70F9D4081007/Backlightforviewsequentialautostereo.docx >>, Retrieved Date: Nov. 1, 2010, pp. 4.

"Ni Releases New Maschine & Maschine Mikro", Retrieved from <http://www.djbooth.net/index/dj-equipment/entry/ni-releases-new-maschine-mikro/>, Accessed: Sep. 17, 2012, 19 pages.

"On-Screen Keyboard for Windows 7, Vista, XP with Touchscreen", Retrieved from <www.comfort-software.com/on-screen-keyboard.html>, Accessed: Sep. 28, 2012, Feb. 2, 2011, 3 pages.

"Optical Sensors in Smart Mobile Devices", ON Semiconductor, Retrieved at <<http://www.onsemi.jp/pub.link/Collateral/TND415-D.PDF, Nov. 2010, 13 Pages.

"What is the Pd-net Project About?", PD-NET Project, Retrieved at http://pd-net.org/about/>>, Retrieved Date: Mar. 10, 2011, 3 Pages.

Piltch, Avram "ASUS Eee Pad Slider SL101 Review", Retrieved from <http://www.laptopmag.com/review/tablets/asus-eee-pad-slider-sl101.aspx>, Sep. 22. 2011, 5 pages.

"Position Sensors", Android Developers, retrieved from <http://developer.android.com/guide/topics/sensors/sensors_position.html>, Accessed on May 25, 2012, 5 pages.

Post, E.R. et al., "E-Broidery: Design and Fabrication of Textile-Based Computing", IBM Systems Journal, vol. 39, Issue 3 & 4, Jul. 2000, pp. 840-860.

Purcher, Jack "Apple is Paving the Way for a New 3D GUI for IOs Devices", Retrieved from: <http://www.patentlyapple.com/patently-apple/2012/01/apple-is-paving-the-way-for-a-new-3d-gui-for-ios-devices.html>, Jan. 12, 2012, 15 pages.

(56) References Cited

OTHER PUBLICATIONS

Qin, Yongqiang et al., "pPen: Enabling Authenticated Pen and Touch Interaction on Tabletop Surfaces", In Proceedings of ITS 2010, Available at <http://www.dfki.de/its2010/papers/pdf/po172.pdf>, Nov. 2010, pp. 283-284.
"Real-Time Television Content Platform", Accenture, PLC, Retrieved at <<http://www.accenture.com/us-en/pages/insight-real-time-television-platform.aspx>>, May 28, 2002, 3 Pages.
Reilink, Rob et al., "Endoscopic Camera Control by Head Movements for Thoracic Surgery", In Proceedings of 3rd IEEE RAS & EMBS International Conference of Biomedical Robotics and Biomechatronics, retrieved from <http://doc.utwente.nl/74929/1/biorob_online.pdf>, Sep. 26, 2010, pp. 510-515.
"SMART Board™ Interactive Display Frame Pencil Pack", SMART Technologies, Available at <http://downloads01.smarttech.com/media/sitecore/en/support/product/sbfpd/400series(interactivedisplayframes)/guidessmartboardinteractivedisplayframepencilpackv12mar09.pdf>, 2009, 2 pages.
"SolRxTM E-Series Multidirectional Phototherapy ExpandableTM 2-Bulb Full Body Panel System", Retrieved from: <http://www.solarcsystems.com/us_multidirectional_uv_light_therapy_1_intro.html >, Accessed on Jul. 25, 2012, 2011, 4 pages.
Sumimoto, Mark, "Touch & Write: Surface Computing With Touch and Pen Input", Retrieved from: <http://www.gottabemobile.com/2009/08/07/touch-write-surfacecomputing-with-touch-and-pen-input/>, Aug. 7, 2009, 4 pages.
Sundstedt, Veronica "Gazing at Games: Using Eye Tracking to Control Virtual Characters", In ACM SIGGRAPH 2010 Courses, retrieved from <http://www.tobii.com/Global/Analysis/Training/EyeTrackAwards/veronica_sundstedt.pdf>, Jul. 28, 2010, 85 pages.
Takamatsu, Seiichi et al., "Flexible Fabric Keyboard with Conductive Polymer-Coated Fibers", In Proceedings of Sensors 2011, Oct. 28, 2011, 4 pages.
"Tilt Shift Lenses: Perspective Control", retrieved from http://www.cambridgeincolour.com/tutorials/tilt-shift-lenses1.htm, Mar. 28, 2008, 11 Pages.
Travis, et al., "Flat Projection for 3-D ", Retrieved at <<http://ieeexplore.ieee.org/stamp/stamp.jsptp=&arnumber=1605201&isnumber=33728>>, Proceedings of the IEEE, vol. 94, No. 3, Mar. 13, 2006, pp. 539-549.
Travis, A. et al., "P-127: Linearity in Flat Panel Wedge Projection." SID Symposium Digest of Technical Papers. vol. 34. No. 1. Blackwell Publishing Ltd, May 2003, pp. 716-719.
Valli, Alessandro, "Notes on Natural Interaction", retrieved from<http://www.idemployee.id.tue.nl/g.w.m.rauterberg/lecturenotes/valli-2004.pdf>, Sep. 2005, 80 pages.
Valliath, G T., "Design of Hologram for Brightness Enhancement in Color LCDs", SID Symposium Digest of Technical Papers. vol. 29, No. 1, pp. 1139-1143, Blackwell Publishing Ltd, May 1998.
Vaucelle, Cati "Scopemate, A Robotic Microscope!", Architectradure, retrieved from <http://architectradure.blogspot.com/2011/10/at-uist-this-monday-scopematerobotic.html>, Oct. 17, 2011, 2 pages.
"Virtualization Getting Started Guide", Red Hat Enterprise Linux 6, Edition 0.2, retrieved from <http://docs.redhat.com/docs/en-US/Red_Hat_Enterprise_Linux/6/htmlsingle/Virtualization_Getting_Started_Guide/index.html> Revised Jun. 18, 2012, Originally Published on May 4, 2011, 24 pages.
"What is Active Alignment?", http://www.kasalis.com/active_alignment.html, retrieved on Nov. 22, 2012, 2 Pages.
Williams, Jim, "A Fourth Generation of LCD Backlight Technology", Retrieved from <http://cds.linear.com/docs/Application%20Note/an65f.pdf>, Nov. 1995, 124 pages.
Xu, Zhi-Gang et al., "Vision-based Detection of Dynamic Gesture", ICTM'09, Dec. 5-6, 2009, retrieved from <http://ieeexplore.ieee.org/stamp/stamp.jsp?tp=&arnumber=5412956> Dec. 5, 2009, pp. 223-226.
Xu, Zhang et al., "Hand Gesture Recognition and Virtual Game Control Based on 3D Accelerometer and EMG Sensors", IUI'09, Feb. 8, 2009, 5 pages.
Yagi, Nobuyuki, Series: The Challenge of "AdapTV"—The Concept of "AdapTV", Retrieved at <<http://www.nhk.or.jp/strl/publica/bt/en/ch0028.pdf>>, Broadcast Technology No. 28, Autumn 2006, pp. 16-17.
Zhang, et al., "Model-Based Development of Dynamically Adaptive Software", In Proceedings of ICSE 2006, Available at <http://www.irisa.fr/lande/lande/icseproceedings/icse/p371.pdf>, May 20, 2006, pp. 371-380.
Zhu, Dingyun et al., "Keyboard before Head Tracking Depresses User Success in Remote Camera Control", In Proceedings of 12th IFIP TC 13 International Conference on Human-Computer Interaction, Part II, retrieved from <http://csiro.academia.edu/Departments/CSIRO_ICT_Centre/Papers?page=5>, Aug. 24, 2009, 14 pages.
"Reflex LCD Writing Tablets", Kent Displays, retrieved from <http://www.kentdisplays.com/products/lcdwritingtablets.html> on Jun. 27, 2012, 3 pages.
U.S. Patent and Trademark Office, Non-Final Office Action of U.S. Appl. No. 13/653,321, Feb. 1, 2013, 13 pages.
U.S. Patent and Trademark Office, Non-Final Office Action of U.S. Appl. No. 13/653,682, Feb. 7, 2013, 11 pages.
U.S. Patent and Trademark Office, Non-Final Office Action of U.S. Appl. No. 13/651,272, Feb. 12, 2013, 10 pages.
U.S. Patent and Trademark Office, Non-Final Office Action of U.S. Appl. No. 13/651,287, Jan. 29, 2013, 13 pages.
U.S. Patent and Trademark Office, Non-Final Office Action of U.S. Appl. No. 13/651,304, Mar. 22, 2013, 9 pages.
U.S. Patent and Trademark Office, Non-Final Office Action of U.S. Appl. No. 13/651,327, Mar. 22, 2013, 6 pages.
U.S. Patent and Trademark Office, Non-Final Office Action of U.S. Appl. No. 13/651,871, Mar. 18, 2013, 14 pages.
U.S. Patent and Trademark Office, Non-Final Office Action of U.S. Appl. No. 13/651,976, Feb. 22, 2013, 16 pages.
U.S. Patent and Trademark Office, Restriction Requirement of U.S. Appl. No. 13/471,139, Jan. 17, 2013, 7 pages.
U.S. Patent and Trademark Office, Restriction Requirement of U.S. Appl. No. 13/651,304, Jan. 18, 2013, 7 pages.
U.S. Patent and Trademark Office, Restriction Requirement of U.S. Appl. No. 13/651,726, Feb. 22, 2013, 6 pages.
U.S. Patent and Trademark Office, Restriction Requirement of U.S. Appl. No. 13/651,871, Feb. 7, 2013, 6 pages.
U.S. Patent and Trademark Office, Notice of Allowance of U.S. Appl. No. 13/470,633, Mar. 22, 2013, 7 pages.
U.S. Patent and Trademark Office, Notice of Allowance of U.S. Appl. No. 13/471,202, May 28, 2013, 7 pages.
U.S. Patent and Trademark Office, Notice of Allowance of U.S. Appl. No. 13/651,195, Jul. 8, 2013, 9 pages.
"Accessing Device Sensors", HP webOS Development Cetner, Retrieved from <https://developer.palm.com/content/api/dev-guide/pdk/accessing-device-sensors.html>, Accessed: on May 25, 2012, 4 pages.
"ACPI Docking for Windows Operating Systems", Retrieved from: <http://www.scritube.com/limba/engleza/software/ACPI-Docking-for-Windows-Opera331824193.php> Accessed on Jul. 6, 2012,10 pages.
Block, S. et al., "DeviceOrientation Event Specification", W3C, Editor's Draft, retrieved from <https://developer.palm.com/content/api/dev-guide/pdk/accessing-devicesensors.html>, Jul. 12, 2011, 14 pages.
Brown, R., "Microsoft Shows Off Pressure-Sensitive Keyboard", retrieved from <http://news.cnet.com/8301-17938_105-10304792-1.html>, Aug. 6, 2009, 2 pages.
Butler, Alex et al., "SideSight: Multi-"touch" Interaction around Small Devices", In the proceedings of the 21st annual ACM symposium on User Interface Software and Technology., retrieved from <http://research.microsoft.com/pubs/132534/sidesight_crv3.pdf>, Oct. 19, 2008, 4 pages.
"Cholesteric Liquid Crystal", Wikipedia Foundation, Retrieved from: <http://en.wikipedia.org/wiki/Cholesteric_liquid_crystal>, Accessed on Aug. 6, 2012, Edited on Jun. 10, 2012, 2 pages.

(56) References Cited

OTHER PUBLICATIONS

"Cirago Slim Case®—Protective case with built-in kickstand for your iPhone 5®", Cirago International, Retrieved from <http://cirago.com/wordpress/wpcontent/uploads/2012/10/ipc1500brochure1.pdf>, Accessed on Jan. 29, 2013, 1 page.
Crider, Michael "Sony Slate Concept Tablet "Grows" a Kickstand", Android Community, Retrieved frorm:<http://androidcommunity.com/sony-slate-concept-tablet-grows-a-kickstand-20120116/>, Jan. 16, 2012, 9 pages.
Das, A. et al., "Study of Heat Transfer through Multilayer Clothing Assemblies: A Theoretical Prediction", AUTEX Rsearch Journal, vol. 11, No. 2, pp. 54-60, Retrieved from <http://www.autexrj.com/cms/zalaczone_pliki/5_013_11.pdf>, Jun. 2011.
"Developing Next-Generation Human Interfaces using Capacitive and Infrared Proximity Sensing", Silicon Laboratories, Inc. Retrieved at <<http://www.silabs.com/pages/DownloadDoc.aspx?FILEURL=support%20documents/technicaldocs/capacitive%20and%20proximity%20sensing_wp.pdf&src=SearchResults>>, Accessed: Jan. 3, 2012, pp. 10.
Dietz, Paul H., et al., "A Practical Pressure Sensitive Computer Keyboard", In Proceedings of UIST 2009, Oct. 2009, 4 pages.
"DR2PA'", Architainment Lighting, Retrieved from <http://www.architainment.co.uk/wpcontent/uploads/2012/08/DR2PA-AU-US-size-Data-Sheet-Rev-H_LOGO.pdf>. Accessed on Sep. 17, 2012, 4 pages.
"First One Handed Fabric Keyboard with Bluetooth Wireless Technology", Retrieved from: <http://press.xtvworld.com/article3817.html>, Jan. 6, 2005, 2 pages.
U.S. Patent and Trademark Office, Final Office Action of U.S. Appl. No. 13/651,195, Apr. 18, 2013,13 pages.
"Force and Position Sensing Resistors: An Emerging Technology", Interlink Electronics, Available at <http://staff.science.uva.nl/~vlaander/docu/FSR/An_Exploring_Technology.pdf>, pp. 1-6, Feb. 1990.
"Frogpad Introduces Weareable Fabric Keyboard with Bluetooth Technology", Geekzone, Retrieved from: <http://www.geekzone.co.nz/content.asp?contentid=3898>, Jan. 7, 2005,3 pages.
Gaver, William W., et al., "A Virtual Window on Media Space", Proceedings of CHI'95, retrieved from <http://www.gold.ac.uk/media/15gaver-smets-overbeeke.MediaSpaceWindow.chi95.pdf>, May 7, 1995, 9 pages.
Glatt, Jeff "Channel and Key Pressure (Aftertouch).", Retrieved from: <http://home.roadrunner.com/~jgglatt/tutr/touch.htm>, Accessed on Jun. 11, 2012, 2 pages.
Hanlon, Mike "ElekTex Smart Fabric Keyboard Goes Wireless", Retrieved from: <http://www.gizmag.com/go/5048/>, Jan. 15, 2006, 5 pages.
Harada, Susumu et al., "VoiceDraw: A Hands-Free Voice-Driven Drawing Application for People With Motor Impairments", In Proceedings of Ninth International ACM SIGACCESS Conference on Computers and Accessibility, retrieved from <http://citeseerx.ist.psu.edu/viewdoc/download?doi=10.1.1.113.7211&rep=rep1&type=pdf >, Oct. 15, 2007, 8 pages.
"How to Use the iPad's Onscreen Keyboard", John Wiley & Sons, Inc., Retrieved from <http://www.dummies.com/how-to/content/how-to-use-the-ipads-onscreenkeyboard.html> on Aug. 28, 2012, 3 pages.
"i-Interactor electronic pen", Retrieved from: <http://www.alibaba.com/productgs/ 331004878 i_interactor_electronic_pen.html>, Accessed on Jun. 19, 2012, 5 pages.
"Incipio LG G-Slate Premium Kickstand Case—Black Nylon", Retrieved from: <http://www.amazon.com/Incipio-G-Slate-Premium-Kickstand-Case/dp/B004ZKP916>, Accessed on May 8, 2012, 4 pages
Korean Intellectual Property Office, International Search Report of PCT/US2010/045676, WIPO, Apr. 28, 2011, 2 pages.
Korean Intellectual Property Office, International Search Report of PCT/US2010/046129, WIPO, Mar. 2, 2011, 3 pages.
Iwase, Eiji "Multistep Sequential Batch Assembly of Three-Dimensional Ferromagnetic Microstructures with Elastic Hinges", Retrieved at <<http://ieeexplore.ieee.org/stamp/stamp.jsp?tp=&arnumber=1549861>>, Journal of Microelectromechanical Systems, vol. 14, No. 6, Dec. 2005, 7 pages.
Kaufmann, Benoit et al., "Hand Posture Recognition Using Real-time Artificial Evolution", EvoApplications'09, retrieved from <http://evelyne.lutton.free.fr/Papers/KaufmannEvolASP2010.pdf>, Apr. 3, 2010, 10 pages.
Kaur, Sukhmani "Vincent Liew's redesigned laptop satisfies ergonomic needs", Designbuzz, Retrieved from: <http://www.designbuzz.com/entry/vincent-liew-s-redesigned-laptopsatisfies-ergonomic-needs/>, Jun. 21, 2010, 4 pages.
Khuntontong, Puttachat et al., "Fabrication of Molded Interconnection Devices by Ultrasonic Hot Embossing on Thin Polymer Films", IEEE Transactions on Electronics Packaging Manufacturing, vol. 32, No. 3, Jul. 2009, pp. 152-156.
Kim, Min Su, et al. "A controllable viewing angle LCD with an optically isotropic liquid crystal." Journal of Physics D: Applied Physics, vol. 43, No. 14, Mar. 23, 2010, 7 pages.
Lee, C. M. G. et al., "Flat-panel backlight for view-sequential 3D display." Optoelectronics, IEE Proceedings-. vol. 151. No. 6. IET, Dec. 2004, 4 pages.
Linderholm, Owen "Logitech Shows Cloth Keyboard for PDAs", PCWorld, Retrieved from: <http://www.pcworld.com/article/89084/logitech_shows_$_{cloth}$_keyboard_for_pdas.html>, Mar. 15, 2002, 5 pages.
Manresa-Yee, Cristina et al., "Experiences Using a Hands-Free Interface", In Proceedings of the 10th International ACM SIGACCESS Conference on Computers and Accessibility, retrieved from <http://dmi.uib.es/~cmanresay/Research/%5BMan08%5DAssets08.pdf>, Oct. 13, 2008, pp. 261-262.
McLellan, Charles "Eleksen Wireless Fabric Keyboard: a first look", Retrieved from: <http://www.zdnetasia.com/eleksen-wireless-fabric-keyboard-a-first-look-40278954.htm>, Jul. 17, 2006, 9 pages.
"Membrane Keyboards & Membrane Keypads", Pannam Imaging, Retrieved from: <http://www.pannam.com/>, Mar. 4, 2009, 2 pages.
"The Microsoft Surface Tablets Comes With Impressive Design and Specs", Microsoft Tablet Review, Retrieved from <http:/ microsoft-tabletreview.com/the-microsoft-surface-tablets-comes-withimpressive-design-and-specs>, Jun. 2012, 2 pages.
"Motion Sensors", Android Developers, retrieved from <http://developer.android.com/guide/topics/sensors/sensors_motion.html>, Accessed on May 25, 2012, 7 pages.
"MPC Fly Music Production Controller", AKAI Professional, Retrieved from: <http://www.akaiprompc.com/mpc-fly>, Accessed Jul. 9, 2012, 4 pages.
Nakanishi, Hideyuki et al., "Movable Cameras Enhance Social Telepresence in Media Spaces", In Proceedings of the 27th International Conference on Human Factors in Computing Systems, retrieved from <http://smg.ams.eng. osakau.ac.jp/~nakanishi/hnp_2009_chi.pdf>, Apr. 6, 2009, 10 pages.
U.S. Patent and Trademark Office, Non-Final Office Action of U.S. Appl. No. 13/651,232, Jan. 17, 2013, 15 pages.
U.S. Patent and Trademark Office, Non-Final Office Action of U.S. Appl. No. 13/471,001, Feb. 19, 2013, 15 pages.
U.S. Patent and Trademark Office, Non-Final Office Action of U.S. Appl. No. 13/471,139, Mar. 21, 2013, 12 pages.
U.S. Patent and Trademark Office, Non-Final Office Action of U.S. Appl. No. 13/471,202, Feb. 11, 2013, 10 pages.
U.S. Patent and Trademark Office, Non-Final Office Action of U.S. Appl. No. 13/471,336, Jan. 18, 2013, 14 pages.
U.S. Patent and Trademark Office, Non-Final Office Action of U.S. Appl. No. 13/651,195, Jan. 2, 2013, 14 pages.
ISA European Patent Office, International Search Report & Written Opinion for Patent Application No. PCT/US2013/043961, Oct. 17, 2013, 11 pages.
State Intellectual Property Office of China, Office Action of Chinese Patent Application No. 2012100239456, Dec. 3, 2013, 12 pages.
State Intellectual Property Office of China, Office Action of Chinese Patent Application No. 2010800371209, Jan. 6, 2014, 7 pages.
Chou, et al., "Imaging and Chromatic Behavior Analysis of a Wedge-Plate Display", Retrieved at<< http://www.di.nctu.edu.tw/2006TDC/papers/Flexible/06-012.doc >>, SID Symposium Digest of Technical Papers vol. 37, Issue 1, pp. 1031-1034, Jun. 2006, pp. 4.

(56) References Cited

OTHER PUBLICATIONS

Adrian Travis, "P-60: LCD Smear Elimination by Scanning Ray Angle into a Light Guide", Retrieved at << http://www2.eng.cam.ac.uk/~-arlt1/P_60.pdf >>, SID Symposium Digest of Technical Papers vol. 35, Issue 1, pp. 474-477, May 2004, 4 pages.

Boual, et al.,"Wedge Displays as Cameras", Retrieved at<< http://www.camfpd.com/72-3.pdf >>SID Symposium Digest of Technical Papers, vol. 37, Issue 1, pp. 1999-2002, Jun. 2006, pp. 4.

A. R. L. Travis, et al., Optical Design of a Flat Panel Projection Wedge Display, 9th International Display Workshops, paper FMC6-3, Dec. 4-6, 2002, Hiroshima, Japan.

Ishida, et al., "A Novel Ultra Thin Backlight System without Optical Sheets Using a Newly Developed Multi-Layered Light-guide", Published Jul. 5, 2012, 4 pages.

Nishizawa, et al., "Investigation of Novel Diffuser Films for 2D Light-Distribution Control", Tohoku University, Aramaki Aoba, Aoba-ku, Sendai 980-8579, Japan, LINTEC Corporation, 23-23 Honcho, Itabashi-ku, Tokyo 173-0001, Japan, Dec. 2011, 4 pages.

Chen, et al., "Design of a Novel Hybrid Light Guide Plate for Viewing Angle Switchable Backlight Module", Institute of Photonic Systems, Ntional Chiao Tung University, Tainan, Taiwan, Jul. 1, 2013, 4 pages.

Phillips, et al., "Links between Holography and Lithography", Fifth International Symposium on Display Holography, 206, Feb. 17, 1995, 9 pages.

Powell, David, "High-Efficiency Projection Screen" U.S. Appl. No. 14/243,501, filed Apr. 2, 2014, 26 pages.

"International Search Report & Written Opinion for PCT Patent Application No. PCT/US2009/055250", Mar. 2, 2010,10 Pages.

State Intellectual Property Office of China, Office Action of Chinese Patent Application No. 200980134848.0, May 31, 2013, 7 pages.

State Intellectual Property Office of China, Office Action of Chinese Patent Application No. 200980134848.0, Dec. 19, 2012, 8 pages.

State Intellectual Property Office of China, Office Action of Chinese Patent Application No. 200980134848.0, May 13, 2013, 7 pages.

State Intellectual Property Office of China, Office Action of Chinese Patent Application No. 200980134848.0, Dec. 4, 2013, 8 pages.

European Patent Office, Extended European Search Report of European Patent Application No. 09812072.8, Germany, Apr. 5, 2012, 6 pages.

European Patent Office, Office Action for European Patent Application No. 09812072.8, Apr. 17, 2013, 5 pages.

Japanese Patent Office, Office Action for Japanese Patent Application No. 2011-526118, Aug. 16, 2013, 8 pages.

State Intellectual Property Office of China, Office Action of Chinese Patent Application No. 201210023945.6, Jun. 25, 2014, 6 pages.

State Intellectual Property Office of China, Office Action of Chinese Patent Application No. 201080037117.7, Jul. 1, 2014, 9 pages.

Japanese Patent Office, Notice of Rejection of Japanese Patent Application No. 2012-525722, mailed Apr. 22, 2014, 15 pages.

Japanese Patent Office, Notice of Rejection of Japanese Patent Application No. 2012-525632, mailed May 2, 2014, 10 pages.

Japanese Patent Office, Final Office Action in Patent Application No. 2012-525722, Aug. 13, 2014, Japan, 17 pages.

European Patent Office, European Search Report in Application No. 12800433.0, PCT/US2012042643, Oct. 28, 2014, Germany, 10 pages.

ISA European Patent Office, International Search Report and Written Opinion PCT/US2014/066248, Mar. 12, 2015, Netherlands, 10 pages.

State Intellectual Property Office of the People's Republic of China, Office Action and Search Report Issued in Chinese Patent Application No. 201280029520.4, Jun. 30, 2015, 10 pages.

\* cited by examiner

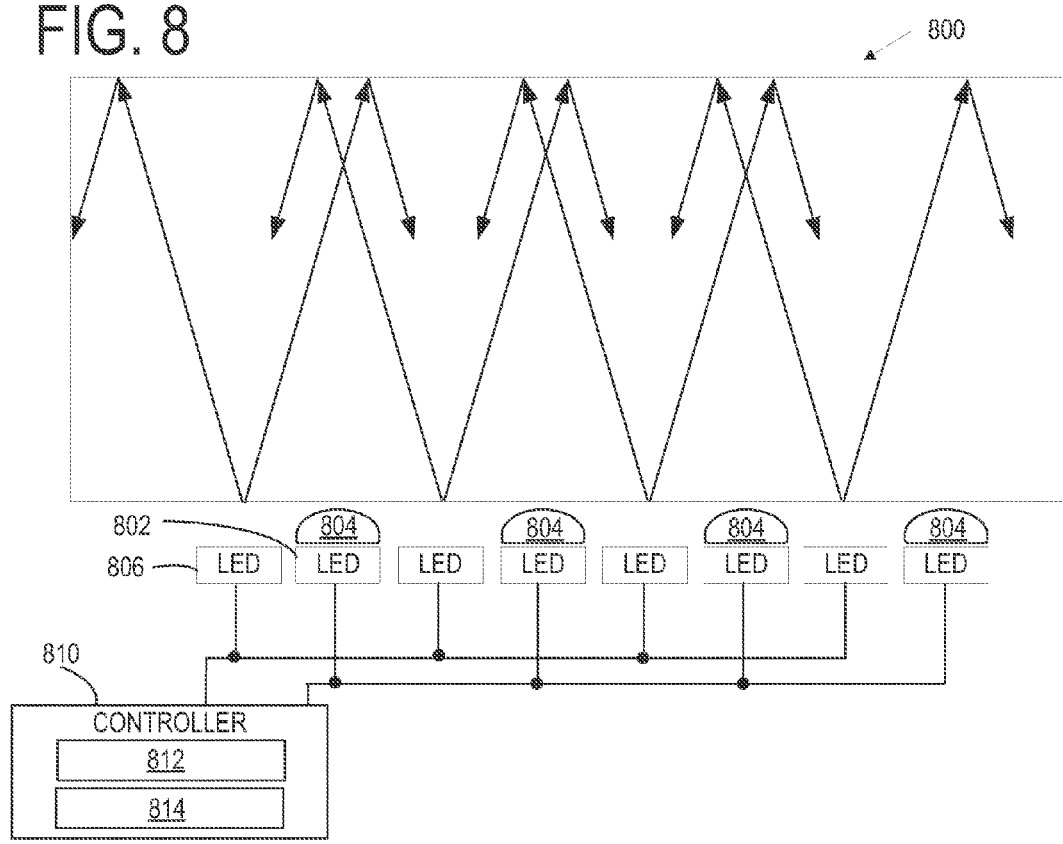
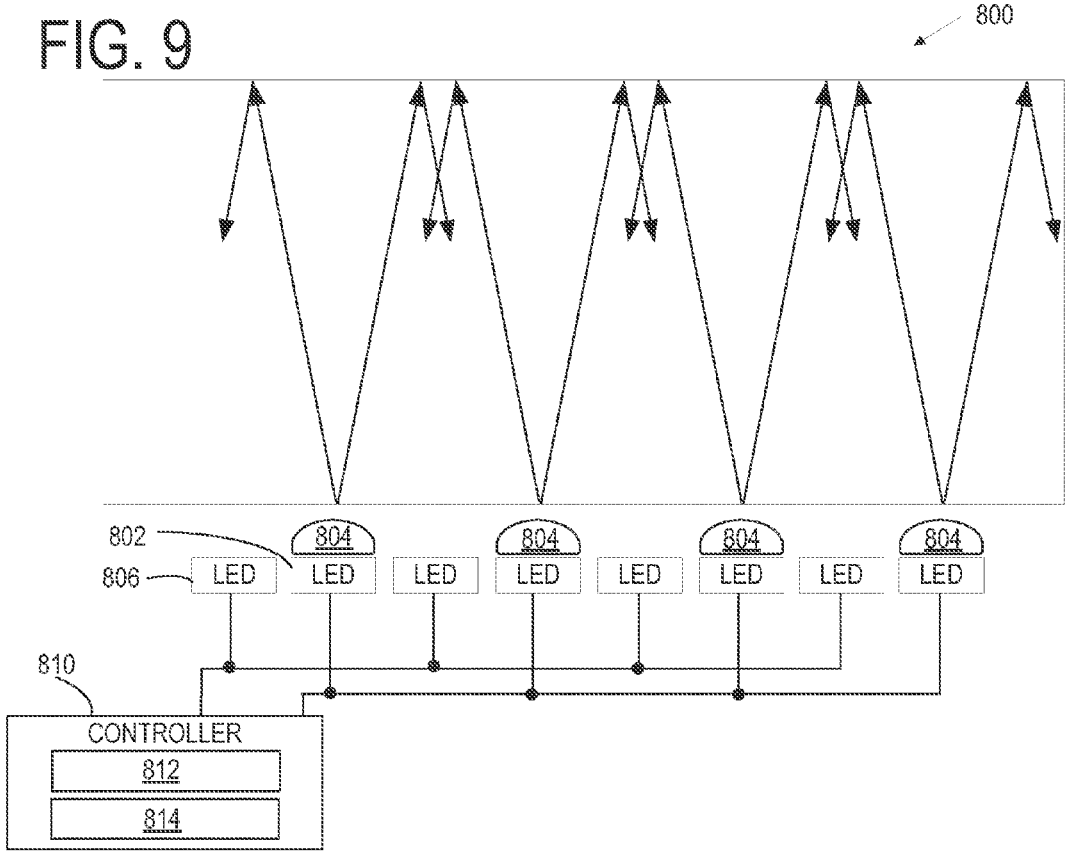

DIRECTIONAL BACKLIGHTING FOR DISPLAY PANELS

BACKGROUND

Display devices, such as laptop computers, tablet computers, slate computers, smart phones, and the like, may use a modulating display panel, such as a liquid crystal display, in combination with a backlight to display images to users. Various backlights are known for such display devices. Some backlight sources, such as light-emitting diodes, are used in combination with a diffuser to distribute light with an acceptably uniform intensity, while others, such as electroluminescent panels, may provide a suitably uniform intensity without a diffuser. Such backlights generally output light having a broad intensity distribution. As a result, a relatively large luminous flux may be output at potentially high angles relative to a normal of the display panel surface plane.

SUMMARY

Various embodiments are disclosed that relate to display panel backlight systems that output light with a narrower angular intensity distribution than a diffuse backlight. For example, one disclosed embodiment provides a backlight system comprising a wedge-shaped light guide comprising a thin end and a thick end, the thick end of the wedge-shaped light guide comprising a linear reflector with plurality of facets, and also comprising a plurality of light sources arranged along the thin end of the light guide.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8 shows an embodiment of a backlight system comprising a first subset of light sources configured to emit light with a wider angular intensity distribution, and a second subset of light sources configured to emit light with a narrower angular intensity distribution, and illustrates light being emitted by the first subset of light sources.

FIG. 9 illustrates light being emitted by the second subset of light sources of the embodiment of FIG. 8.

DETAILED DESCRIPTION

As mentioned above, conventional backlights for modulating display panels often output light having a broad intensity distribution. Such backlights may allow displayed images to be viewed from a wide range of angles. However, some display devices, including but not limited to laptop computers, are often used by one user at a time facing the screen directly. Thus, light directed out of the display panel at high angles to the screen normal may be wasted in such devices. The production of such wasted light may impact battery life. Further, in some situations, such as while working on potentially confidential matters and/or in close proximity to strangers (e.g. while on an airplane), it may be desirable for displayed images not to be visible at high angles to help maintain privacy.

Thus, various embodiments are disclosed herein that relate to the backlighting of display panels via light having a narrower angular intensity distribution than diffuse backlighting. The disclosed embodiments also may have a wider angular light intensity distribution than a collimated source, thereby permitting some level of off-axis viewing where it is desired to share an image with another.

Figure 1:
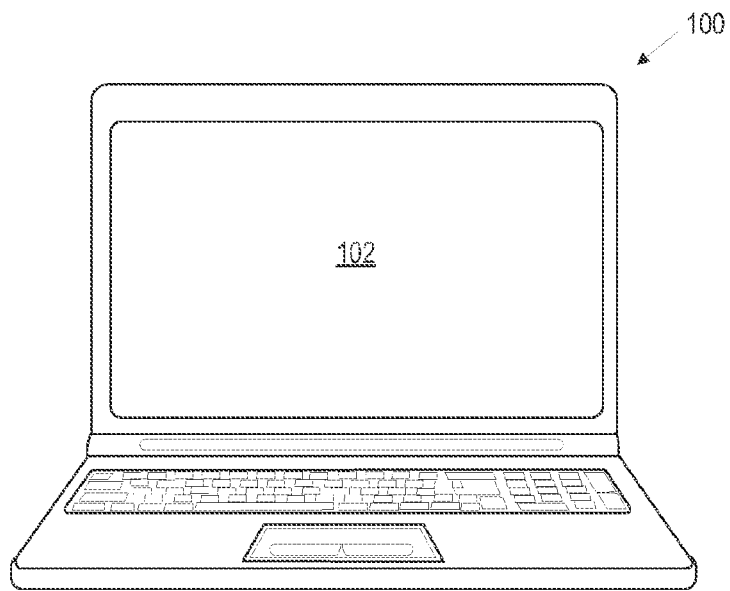
FIG. 1 shows an embodiment of a backlit display device in the form of a laptop computer.

FIG. 1 shows an embodiment of a display device in the form of a laptop computer 100 having a backlit display panel 102. It will be understood that laptop computer 100 is depicted for the purpose of example, and that the embodiments described herein may be used with any suitable display device, including but not limited to notepad computers, tablet computers, slate computers, smart phones and other portable phones, portable media players, computer monitors, televisions, etc.

Figure 2:
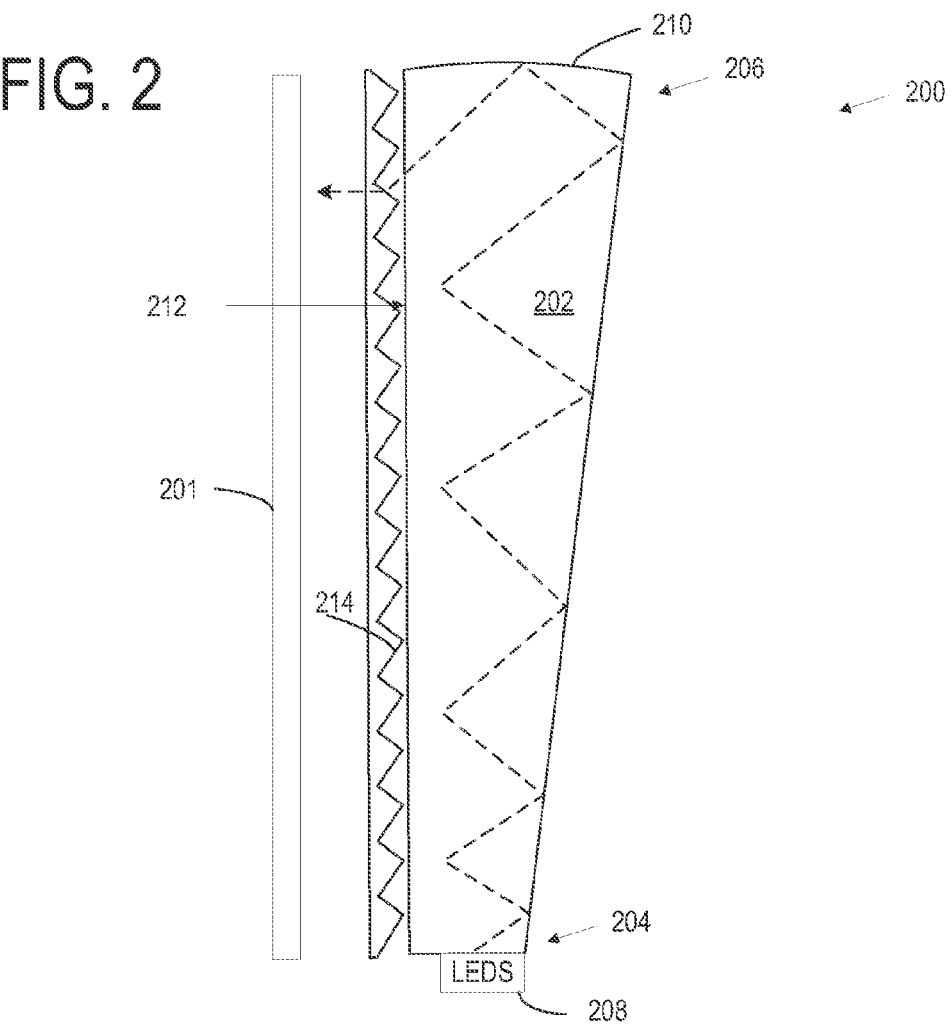
FIG. 2 shows a schematic depiction of a side view of an embodiment of a backlight system and a modulating display panel.
Figure 3:
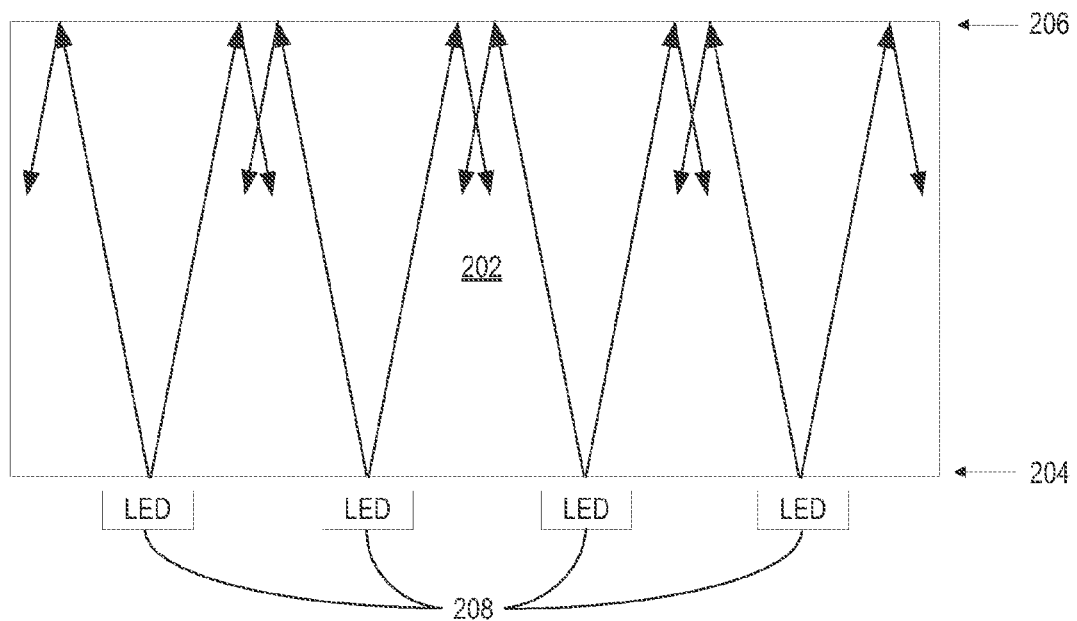
FIG. 3 shows a schematic depiction of a top view of the backlight system embodiment of FIG. 2.

FIG. 2 shows a schematic side view of an embodiment of a backlight system 200 for a display panel 201 and FIG. 3 shows a schematic top view of backlight system 200. It will be understood that the relative sizes of structural features shown in FIG. 2 are exaggerated for the purpose of illustration, and are not intended to be limiting. Backlight system 200 comprises a wedge-shaped light guide 202 having a thin end 204 and a thick end 206. Thin end 204 comprises a light input interface configured to receive light injected by a plurality of light sources 208, such as the depicted light-emitting diodes or other suitable light sources. Thick end 206 comprises a linear reflector 210 configured to change the angle of internally reflected light from light sources 208 and to direct the light toward a light exit interface 212 such that the light exits the light exit interface 212 at or above a critical angle of reflection. The term "linear reflector" refers to a reflector that is not curved in a dimension along a width of the wedge. A wedge having such a reflector may be formed from a linear extrusion, as explained in more detail below, or may be formed in any other suitable manner, such as injection molding. A turning structure 214 may be used to redirect light emitted by the front of the light guide 202 to a weak diffuser and then through the display panel 201. Light emitted from the back of the light guide is turned by a reflector and returned to the front. The reflector can for example be metalized polyester sheet, prismatic reflector, or multilayer dielectric coated sheet.

The backlight system 200 utilizes a plurality of light sources 208 illuminated together, rather than a single light source, because the light guide 202 is non-imaging. As shown in FIG. 3, the plurality of light sources 208 are arranged along the thin end 204 of the light guide 202 such that light from each light source 208 fans out and overlaps as it propagates through the light guide. The use of a sufficient number of light sources 208 based upon the angular distribution of the diffuser may allow the production of a backlight with a suitably uniform intensity across the area of the exit interface 212.

The use of the linear reflector 210 may offer various advantages. For example, manufacturing a wedge-shaped light guide 202 with a reflector that is a linear extrusion may be easier and less expensive than manufacturing an imaging wedge-shaped light guide having a toroidal reflector. This is because the wedge with the linear reflector may be formed from linear extruding and polishing, without any machining to form the reflector shape. In contrast, a toroidal reflector may require machining after extruding to form a desired reflector shape. Further, the linear reflector allows a wedge to have a perimeter that is the same as or just slightly larger than a corresponding LCD panel. In contrast, a wedge having a toroidal reflector extends beyond the perimeter of a corresponding LCD panel due to the curvature of the reflector.

Light guides of the design described herein have a thickness that is limited by the size of the LED illuminating the thin end of the light-guide. For example, in one specific embodiment, the light guide 202 has a 0.8/1.8 ratio of thin end/thick end thickness, and has a maximum thickness of 1.8 mm, for a maximum backlight system target thickness of 2 mm including a turning structure thickness of 160 microns. Such a light guide is matched to standard 3806 side emitting LEDs (3.8× 0.6 mm package size). It will be understood that these dimensions are presented for the purpose of example, and are not intended to be limiting The light guide 202 may be formed in any suitable manner that yields a surface with a desired smoothness. For a thin light guide for a laptop computer, for example, it is advantageous to form the part by injection molding. For example, roughness averages of the order 1 nm and light transmission of 90% per meter may be achievable by molding material such as poly(methyl methacrylate) (PMMA). It will be understood that these specific embodiments are described for the purpose of illustration and are not intended to be limiting in any manner, as any suitable material may be used to form a light guide having any suitable smoothness and transmissivity.

The reflector 210 may be formed without machining, for example by injection molding. In injection molding, polymer enters a cavity which is reverse of the desired form. Typically the cavity will comprise the light exit face 212 and the opposing major surface, and the reflector 210. Plastic enters the injection mold cavity through the thin end 204. Once the plastic has frozen, the part is removed from the injection mold tool and the gate material that remains along face 204 is removed and the face is machined and polished or laser cut so that it is smooth.

Figure 4:
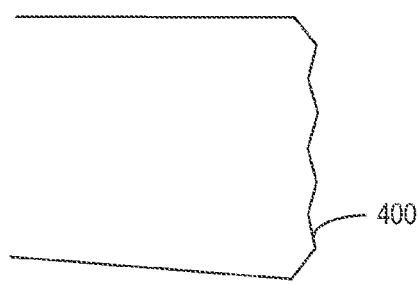
FIG. 4 shows a schematic depiction of an embodiment of a faceted end reflector for the light guide of the embodiment of FIG. 2.

In some embodiments, as shown in FIG. 4, the reflector 210 may comprise a plurality of facets 400. The use of a faceted reflector may help to avoid modulation of light near the reflector end. The facets 400 may have any suitable dimensions. For example, in embodiments where the thin/thick end ratio is 0.8/1.8, the reflector may have eight facets each having a height of 0.225 mm and an angle of 17.0 degrees with respect to an end plane of the light guide. It will be understood that these values are presented for example, and are not intended to be limiting in any manner.

In some embodiments, a concentrator may be used to concentrate light from each light source for injection into the light guide 202. Any suitable concentrator design may be used. For example, an LED light source may be formed from a LED embedded in an optically transmissive material. In such embodiments, a concentrator may be formed by forming cutouts in the transmissive material such that the interface between air and the transmissive material created by the cutouts defines a desired emitter angle and/or beam shape by total internal reflection. Such concentrator designs increase the apparent source size while reducing the range of emitted angles. Such devices are disclosed, for example, in the book "High Collection Non Imaging Optics" by Welford and Winston, published in 1989.

In another embodiment, the concentrator shapes are cut or directly molded into the thin face of the light-guide 202, and the LEDs are soldered to a flexible PCB strip. The LED strip is then butted up against the light guide 202.

Figure 5:
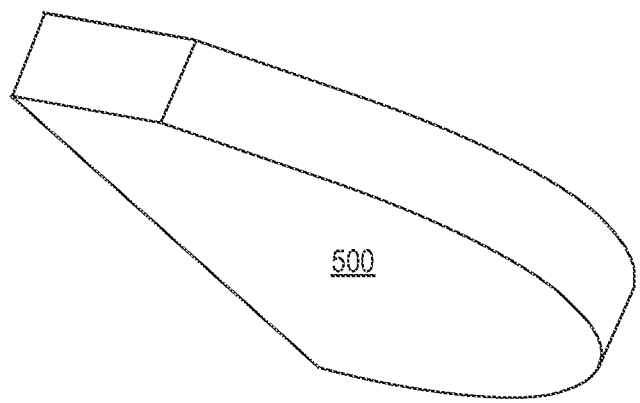
FIG. 5 shows an embodiment of a concentrator comprising a cylindrical lens.

In other embodiments, a concentrator external to the LED packaging may be used. FIG. 5 depicts an example embodiment of such a concentrator 500 in the form of a cylindrical lens that acts as a horizontal collimator (e.g. where the light is concentrated in a direction along the thin end of the light guide 202). An angular distribution of light from such a concentrator may be determined by a radius and conic constant of the cylindrical lens. Such lenses may be made in strips, allowing for efficient manufacturing and installation. Light may be coupled into the light guide 202 from concentrator 500 by bounding a top and a bottom of the interface between the concentrator and the wedge with reflective strips, for example.

Light guide 202 may have any suitable dimensions, including but not limited to the specific examples given above. One embodiment of a method of designing light guide 202 for a specific application is as follows. First, a size and maximum thickness of light guide 202 is selected based upon a desired end use. These quantities may take into account factors such as a turning structure thickness, display panel thickness, and other such geometric factors. Next, a power budget may be calculated based upon a desired output intensity. Calculating a power budget may take into account factors such as light source intensities, display panel transmission and loss factors, turning film losses, light guide loss factors (e.g. light guide material losses due to absorption, back reflections from the turning structure, reflections from the linear reflector, etc.), and light source coupling losses, and may help to determine how many and what type of light sources to utilize.

After determining a power budget, a concentrator may be designed based upon a desired horizontal light source angle, and modeling software such as ZEMAX, available from the Zemax Development Corporation of Bellevue, Wash., may be used to optimize the light distribution by modifying the reflector facet angle and the ratio of the thicknesses of the thin and thick end of the light-guide. The distribution of illuminance on the exit face is calculated by ray tracing. The distribution may be widened by changing the thickness ratio and centered by changing the facet angles in the reflector. It has been found that a thickness ratio of 0.8:1.8 and a facet angle of 17 degrees (relative to the center plane of the light guide)

are suitable in one embodiment. In general, the light exit surface and opposing surface may be configured to be planar. However, the light output distribution may be further flattened by changing surface spatial frequency components of the light exit surface and opposing major face. The distribution may be flattened further by modifying an input geometry. Once a suitable light guide structure is identified via such modeling, a prototype may be constructed and tested via 13-point conoscopic testing or the like to determine a uniformity of the light emitted from the backlight system at different points across the backlight output. The design modification processes may then be performed iteratively to achieve a product design having desired optical properties.

Figure 6:
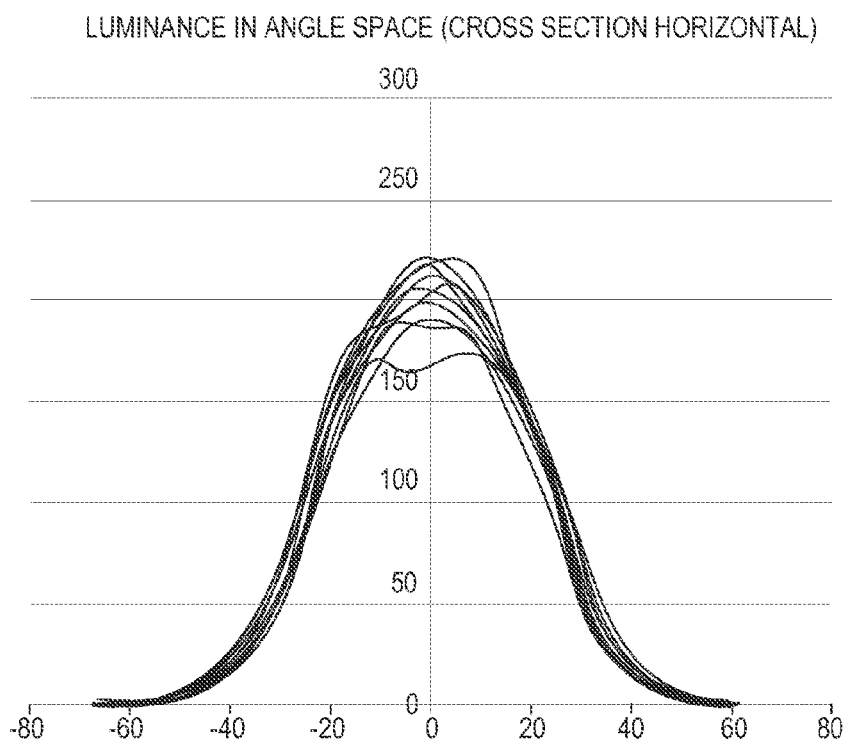
FIG. 6 shows an angular intensity distribution of light emitted at each of a plurality of test locations for an embodiment of a backlight system.
Figure 7:
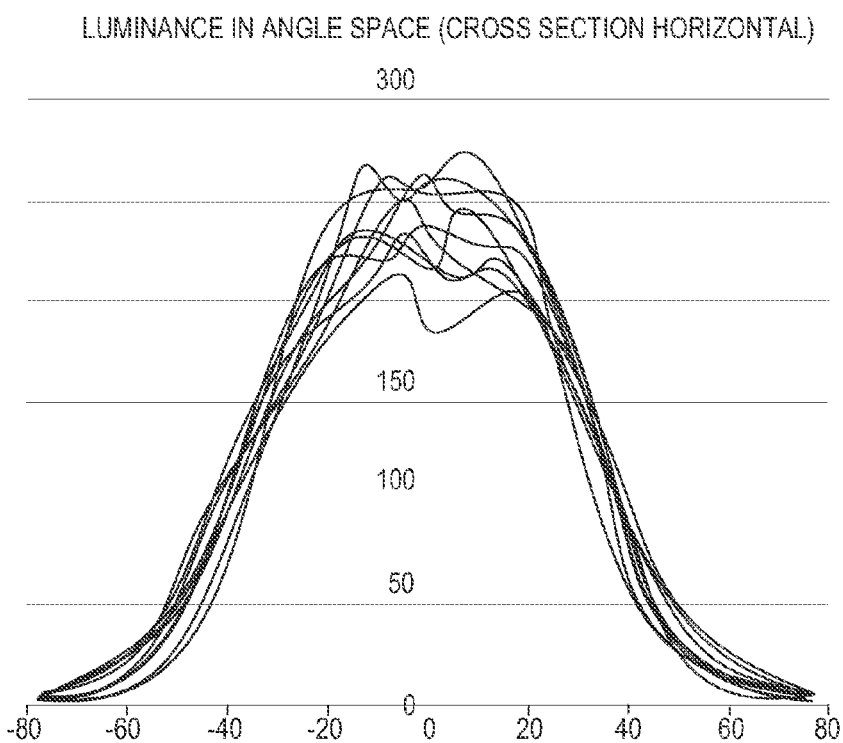
FIG. 7 shows an angular intensity distribution of light emitted at each of a plurality of test locations for another embodiment of a backlight system.

FIGS. 6 and 7 show graphs that illustrate luminance as a function of viewing angle at a plurality of locations across the light exit surface of the light guide. The data illustrated in these figures was gathered via 13-point conoscopic ray tracing of a wedge-shaped light guide having planar major surfaces, a 0.8/1.8 thin/thick ratio, and a rear reflector having the configuration described above with reference to FIG. 4. The data in FIG. 6 was gathered via a narrow angle configuration that utilized 16 LEDs spaced at 21.4 mm intervals along the thin edge of a 15.6" diagonal, 16:9 format backlight, coupling light into concentrator structures cut into the backlight. The data in FIG. 7 was gathered via a second wide angle configuration that utilized 32 LEDs spaced between the first set of 16 in groups of 2, without concentrator structures. The depicted curves show angular intensity variation in a horizontal direction transverse to an optical axis of the light guide. It will be understood that intensity variation in the vertical direction may be substantially similar in both designs where the light sources have a similar vertical emitter angle.

First referring to FIG. 6, the narrow angle configuration was found to have a luminance uniformity of approximately 84%. Next referring to FIG. 7, the wide angle configuration was found to have a luminance uniformity of approximately 74%. In either case, such uniformity may be sufficient for use with display panels for laptop, notebook, notepad, slate, etc. computing devices, for which a uniformity of >60% may be desirable.

The wide angle and narrow angle configurations may be used together in a dual mode backlight system that can switch between the configurations under various circumstances. FIGS. 8 and 9 illustrate an embodiment of such a dual mode backlight system 800 having a first subset of light sources configured to output light with a narrower angle and a second subset of light sources configured to output light with a wider angle. In these figures, the first subset of light sources 802 are shown as LEDs each having a corresponding concentrator 804, while the second subset of light sources 806 are shown as LEDs without concentrators. It will be understood that, in other embodiments, both subsets of light sources may utilize concentrators having different output angles. Further, it will be understood that any other suitable light source than LEDs may be used. While LEDs of the first and second subsets of light sources are shown in an alternating configuration in FIGS. 8 and 9, it will be understood that the first and second plurality of light sources may have any suitable arrangement relative to one another, and also may each have any suitable number of individual light sources. Further, while described in the context of a dual mode system, it will be understood that a backlighting system may have any suitable number of subsets of light sources to enable any suitable number of backlighting modes.

Backlight system 800 further comprises a controller 810. Controller includes a data-holding subsystem 812 configured to hold machine-readable instructions, and a logic subsystem 814 configured to execute the instructions stored in the data-holding subsystem to switch between a narrow angle mode and in a wide angle mode upon occurrence of a triggering event. The controller 810 may take the form of a dedicated on-board controller that is contained within the display system enclosure, a dedicated controller built in to a related device (e.g. located on a motherboard of a computing device that incorporates the backlight system), or may have any other suitable configuration. Further, it will be understood that the backlight system 800 may be in communication with other components (not shown in FIGS. 8-9) of a computing device that controls the backlight system. For example, the controller 810 may receive instructions from a processor or other logic components of a computing device to which the backlight system controller is coupled, such that the processor or other logic components can trigger an automated switch between a narrow angle mode and a wide angle mode.

FIG. 8 depicts operation of the dual mode backlight system 800 in a narrow angle mode. In this mode, the first subset of light sources 806 are operated in an on state, while the second subset of light sources 802 are operated in an off state. In this mode, the light emitted from a display screen has a narrower horizontal angular luminance distribution, thereby helping to maintain privacy and conserve battery life. Next, FIG. 9 depicts operation of the dual mode backlight system 800 in a wide angle mode in with the first and second subsets are respectively operated in off and on states. In this mode, the light emitted from a display screen has a wider horizontal angular luminance distribution than that of the narrow angle mode, but still narrower than a conventional backlight.

Where the narrow and wide angle modes respectively have the angular luminance distributions shown in FIGS. 6-7, the narrow angle mode may have a full-width half-maximum (FWHM) of approximately 40-45 degrees, while the wide angle mode may have a FWHM of approximately 70-80 degrees. With these luminance distributions, the narrow angle mode may utilize ⅓ of the power of a conventional backlight system, while the wide angle mode may utilize ⅔ of the power of a conventional backlight system, where the conventional backlight system is one utilizing prismatic brightness enhancement films.

As a more specific example, referring to the specific configurations described with reference to FIGS. 6-7, by switching on narrow angle subset of 16 LEDs, the user has a substantially private view. By switching on the wide angle subset of 32 LEDs, a public view is obtained. When both subsets of LEDs are lit, the view is both public and high brightness in the centre of the viewing cone, which may for example be useful in high ambient lighting situations. The power consumption in private mode of this embodiment may be significantly lower than a conventional backlight unit, potentially by a factor of 3-5 depending on the design of the conventional backlight unit to which it is compared.

Backlight system 800 may be configured to switch between the wide angle mode and the narrow angle mode based upon any suitable triggering event. Examples include, but are not limited to, manual user selection and automated triggering. For example, a user may wish to utilize a narrow angle mode as a default setting to conserve power and maintain privacy, but manually switch to a wide angle mode for shared viewing of images displayed on the display panel. Likewise, a computing device may include machine-readable instructions executable by a logic subsystem of a computing device to switch the viewing mode from the wide angle viewing mode to the narrow angle viewing mode based upon the occurrence of a triggering event during execution of a program. As a more specific example, such instructions may be executable to detect a user browsing from a non-secure web page to a secure web page, and may in response change from a wide angle mode to a narrow angle mode. It will be understood that this specific embodiment is presented for the purpose of example, and is not intended to be limiting in any manner.

Figure 10:
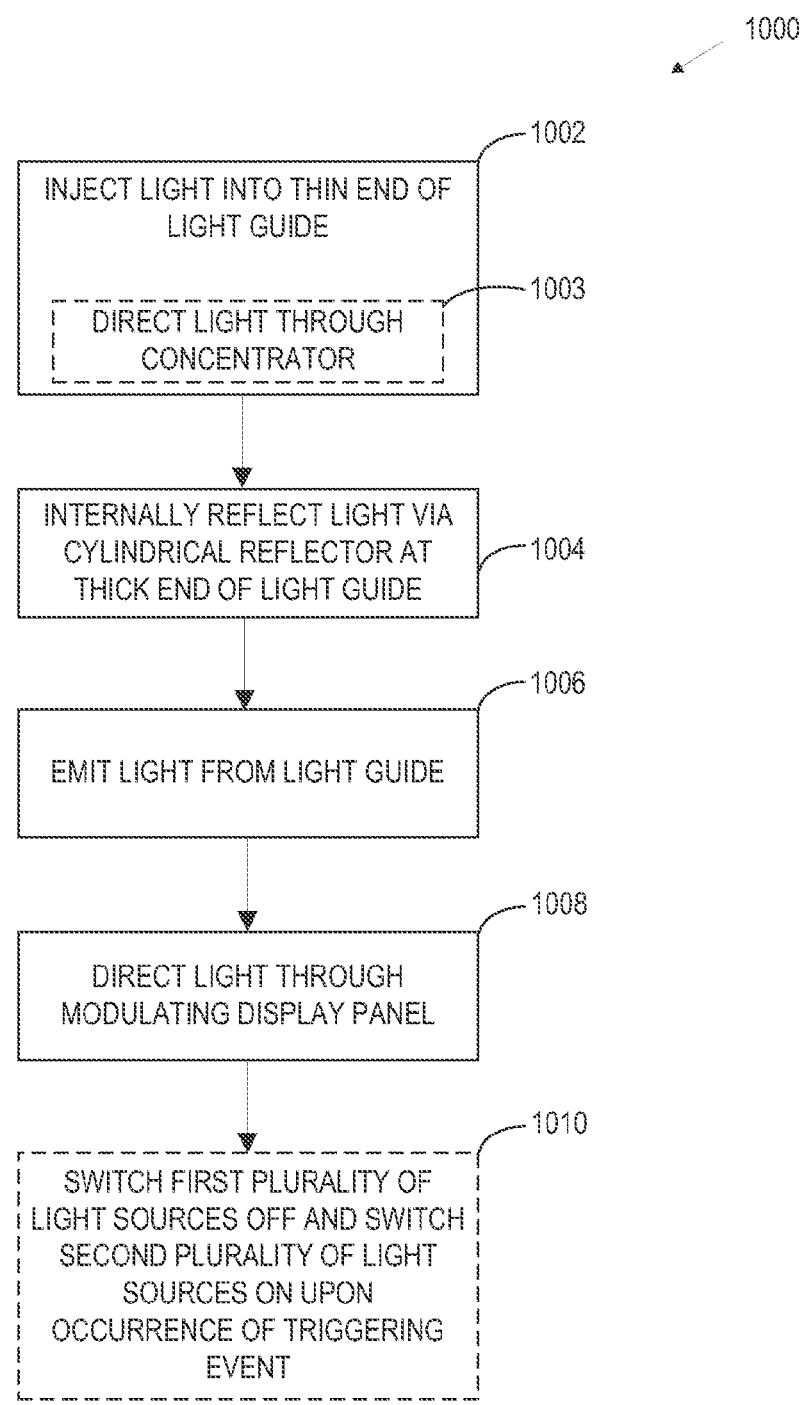
FIG. 10 shows a flow diagram depicting an embodiment of a method of operating a backlit display device.

FIG. 10 shows an embodiment of a method 1000 of operating a backlit display device. Method 1000 comprises, at 1002, illuminating a plurality of light sources to inject light into a thin end of a wedge-shaped light guide at multiple locations along a length of the thin end of the wedge-shaped light guide, and at 1004, internally reflecting the light via a reflector disposed at a thick end of the wedge-shaped light guide. In some embodiments, as shown at 1003, light may be directed through a concentrator before being introduced into the light guide. Next, method 1000 comprises, at 1006, emitting the light from the wedge-shaped light guide, and at 1008, directing the light emitted from the light guide through a modulating display panel to produce a displayed image.

As described above, in some instances, the plurality of light sources may be a first plurality of light sources, and a backlighting system may at least a second plurality of light sources in which each light source is configured to inject light into the light guide with a wider angular intensity distribution than that of the first plurality of light sources. As such, method 1000 optionally comprises, at 1010, switching the first plurality of light sources off and switching the second plurality of light sources on upon occurrence of a triggering event. The triggering event may be any suitable event, including but not limited to a user request to manually switching viewing modes and/or events detected automatically by software, firmware and/or hardware.

Figure 11:
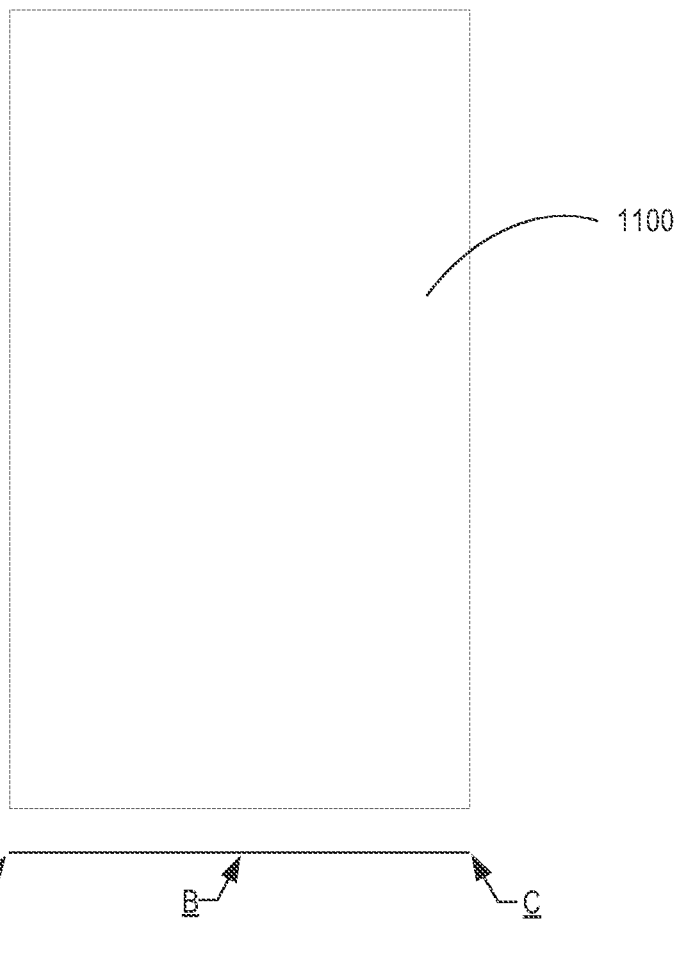
FIG. 11 shows an embodiment of a turning structure.
Figure 12:
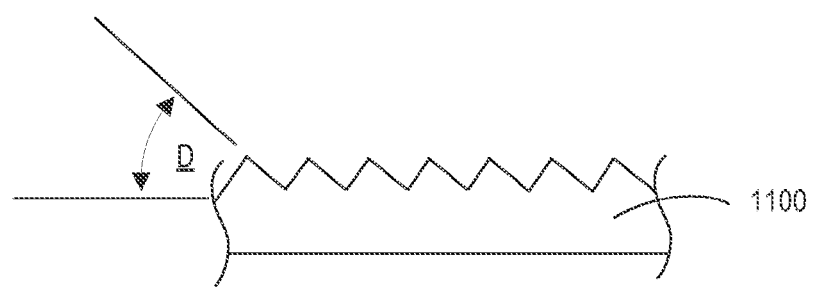
FIG. 12 shows a side view of a plurality of facets of the embodiment of FIG. 11.

In some embodiments, a turning structure having a changing facet angle as a function of position may be utilized in combination with a cylindrically reflecting wedge-shape light guide to form an imaging system. FIG. 11 shows a schematic view of an example embodiment of an imaging turning structure 1100 configured to be used with a cylindrically reflecting wedge-shape light guide, and FIG. 12 shows a schematic side view of facets of the imaging turning structure. The facet angle of the turning structure 1100, illustrated as angle D in FIG. 12, varies smoothly from point A to point C of FIG. 11, with point B signifying a midpoint. The facet angles may vary between any suitable values. For example, in some embodiments, the facet angles may vary between 50 and 57 degrees, with the angle at point B being 53.5 degrees. It will be understood that these values are presented for the purpose of example, and are not intended to be limiting in any manner.

Figure 13:
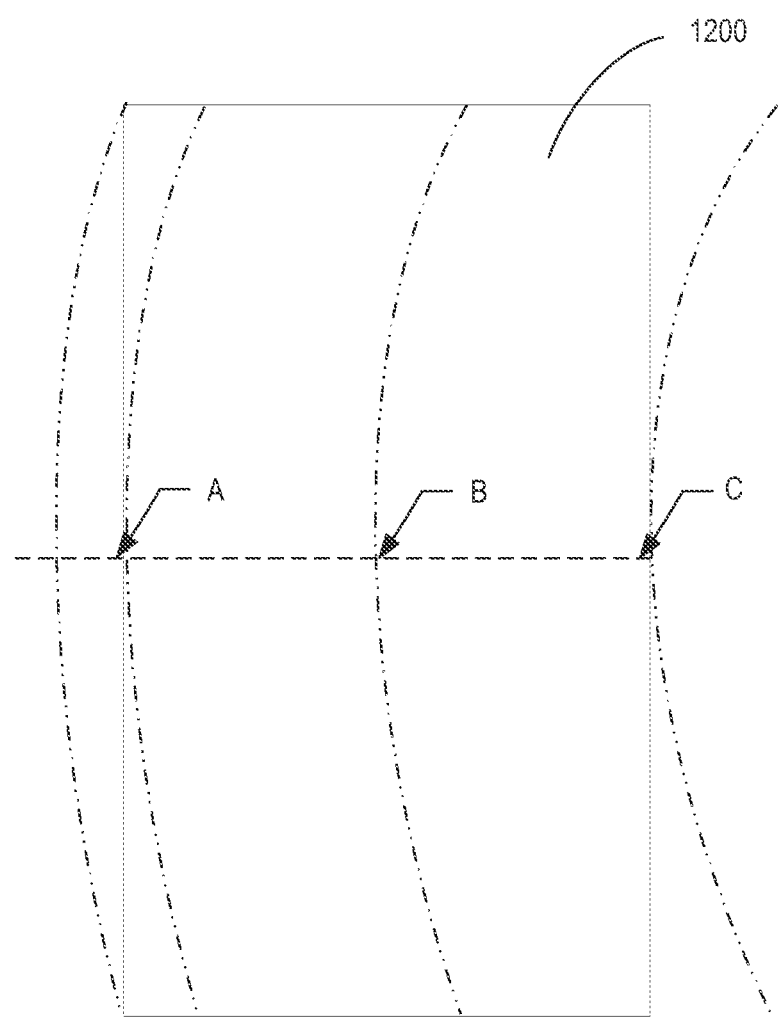
FIG. 13 shows another embodiment of a turning structure.

The facets of turning structure 1100 extend in a straight line along a long dimension of the turning structure 1100. FIG. 13 shows another embodiment of an imaging turning structure 1300 comprising facets arranged in a circular pattern. As with turning structure 1100, the facets of turning structure 1300 vary across the turning structure. In some embodiments, the facets may vary between 50 and 57 degrees between points A and C, and have a value of 53.5 at midpoint B. In other embodiments, the facets may have any other suitable values.

The turning structures 1100 and 1300 may have any suitable thicknesses and may be formed in any suitable manner. For example, in some embodiments the turning structures have a thickness of 0.65 microns, and are formed by linear extrusion (turning structure 1100) or by reel to reel replication (turning structure 1100 or 1300), or by hot pressing (turning structure 1100 or 1300). It will be understood that these specific embodiments are described for the purpose of example, and are not intended to be limiting in any manner.

As mentioned above, in some embodiments, the major faces of a cylindrically reflecting wedge-shaped light guide (e.g. the light exit interface and the opposite face) may be non-planar to help improve illuminance uniformity. The profile of such a light guide may be determined in any suitable way. One example embodiment is as follows. First, an angular optical power distribution at desired angular increments (such as 0.1 of a degree) of the light relative to the optical axis of the light guide may be determined (a) at the exit of the light source, (b) inside of the light guide before the end reflector, and (c) inside of the light guide after the end reflector. The distribution inside of the light guide before the reflector will be narrower than the distribution at the exit of the light source due to Snell's law. Also, as the light guide thickness may increase by a factor of approximately two from the thin end to the thick end, by the equivalence of index to thickness theorem, the injection of light into the wedge-shaped light guide is similar in effect to injecting light into a guide of double the refractive index as the actual light guide refractive index. The end reflector offsets the distribution within the light guide by twice its angle relative to an end plane of the reflector.

The thickness of the light guide at any point is determined by the change in angle of a ray. Given that $t*\sin(\theta)$ is a constant, the point at which any given ray of angle theta originating from the linear reflector exits the light guide may be determined. The distance between two rays is set by the power density. In order to get uniform illuminance on the light guide surface, the distance between two neighboring rays is proportional to the power density in angle space. The total distance to the ray exit point is therefore proportional to the integral of the power density. The rays exiting first are those with the highest angle at the reflector. From this, light guide thickness and distance as a function of ray angle may be determined. Then, thickness and distance may be plotted against one another to determine a light guide profile that produces a flat power distribution on exit from the guide. It will be noted that variations from planarity of +/−15 microns may be sufficient to increase the uniformity of the wedge-shaped light guide.

As mentioned above, in some embodiments, the disclosed backlight systems and backlighting methods may be tied to a computing system including one or more computers. In particular, the methods and processes described herein may be implemented as a computer application, computer service, computer API, computer library, and/or other computer program product.

Figure 14:
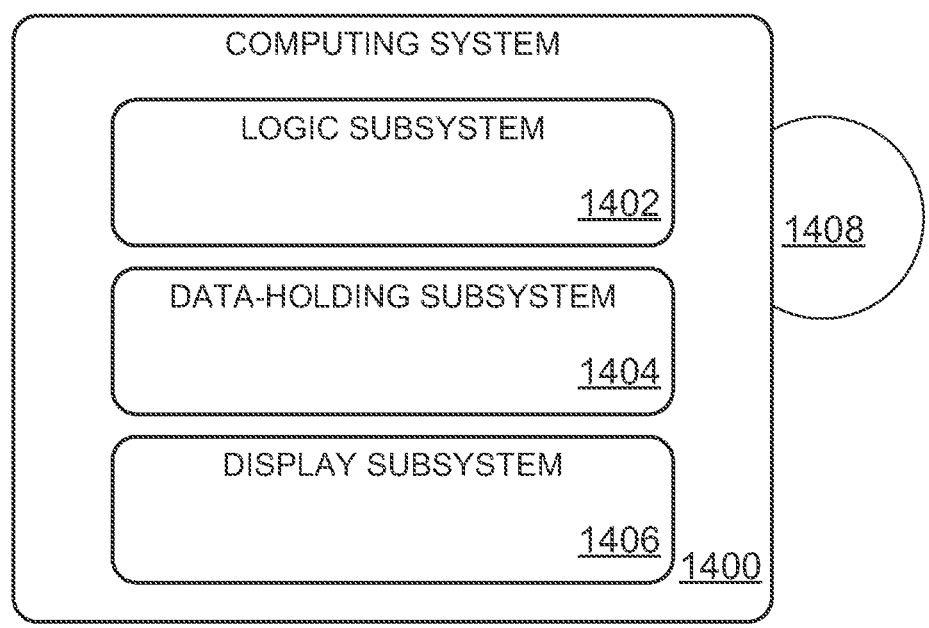
FIG. 14 shows a schematic depiction of an embodiment of a computing device.

FIG. 14 schematically shows a nonlimiting computing system 1400 that may perform one or more of the above described methods and processes. Computing system 1400 is shown in simplified form. It is to be understood that virtually any computer architecture may be used without departing from the scope of this disclosure. In different embodiments, computing system 1400 may take the form of a mainframe computer, server computer, desktop computer, laptop computer such as that shown in FIG. 1, tablet computer, home entertainment computer, network computing device, mobile computing device, mobile communication device, gaming device, etc.

Computing system 1400 includes a logic subsystem 1402 and a data-holding subsystem 1404. Computing system 1400 also includes a display subsystem 1406, and/or other components not shown in FIG. 14, such as a communication subsystem, user input devices such as keyboards, mice, game controllers, cameras, microphones, and/or touch screens, for example.

Logic subsystem 1402 may include one or more physical devices configured to execute one or more instructions. For example, the logic subsystem 1402 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 1402 may include one or more processors that are configured to execute software instructions. Additionally or alternatively, the logic subsystem 1402 may include one or more hardware or firmware logic machines configured to execute hardware or firmware instructions. Processors of the logic subsystem 1402 may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 1404 may include one or more physical, non-transitory, devices configured to hold data and/or instructions executable by the logic subsystem to implement the herein described methods and processes. When such methods and processes are implemented, the state of data-holding subsystem 1404 may be transformed (e.g., to hold different data).

Data-holding subsystem 1404 may include removable media and/or built-in devices. Data-holding subsystem 1404 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 1404 may include devices with one or more of the following characteristics: volatile, nonvolatile, dynamic, static, read/write, read-only, random access, sequential access, location addressable, file addressable, and content addressable. In some embodiments, logic subsystem 1402 and data-holding subsystem 1404 may be integrated into one or more common devices, such as an application specific integrated circuit or a system on a chip.

FIG. 14 also shows an aspect of the data-holding subsystem in the form of removable computer-readable storage media 1408, which may be used to store and/or transfer data and/or instructions executable to implement the herein described methods and processes. Removable computer-readable storage media 1408 may take the form of CDs, DVDs, HD-DVDs, Blu-Ray Discs, EEPROMs, and/or floppy disks, among others.

It is to be appreciated that data-holding subsystem 1404 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "software," "firmware" and "program" may be used to describe an aspect of computing system 1400 that is implemented to perform one or more particular functions. In some cases, such a module, program, or engine may be instantiated via logic subsystem 1402 executing instructions held by data-holding subsystem 1404. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

Display subsystem 1406 may be used to present, via the backlighting system embodiments disclosed herein, a visual representation of data held by data-holding subsystem 1404. As the herein described methods and processes change the data held by the data-holding subsystem, and thus transform the state of the data-holding subsystem, the state of display subsystem 1406 may likewise be transformed to visually represent changes in the underlying data. Display subsystem 1406 may include one or more display devices combined with logic subsystem 1402 and/or data-holding subsystem 1404 in a shared enclosure, or such display devices may be peripheral display devices.

Figure 15:
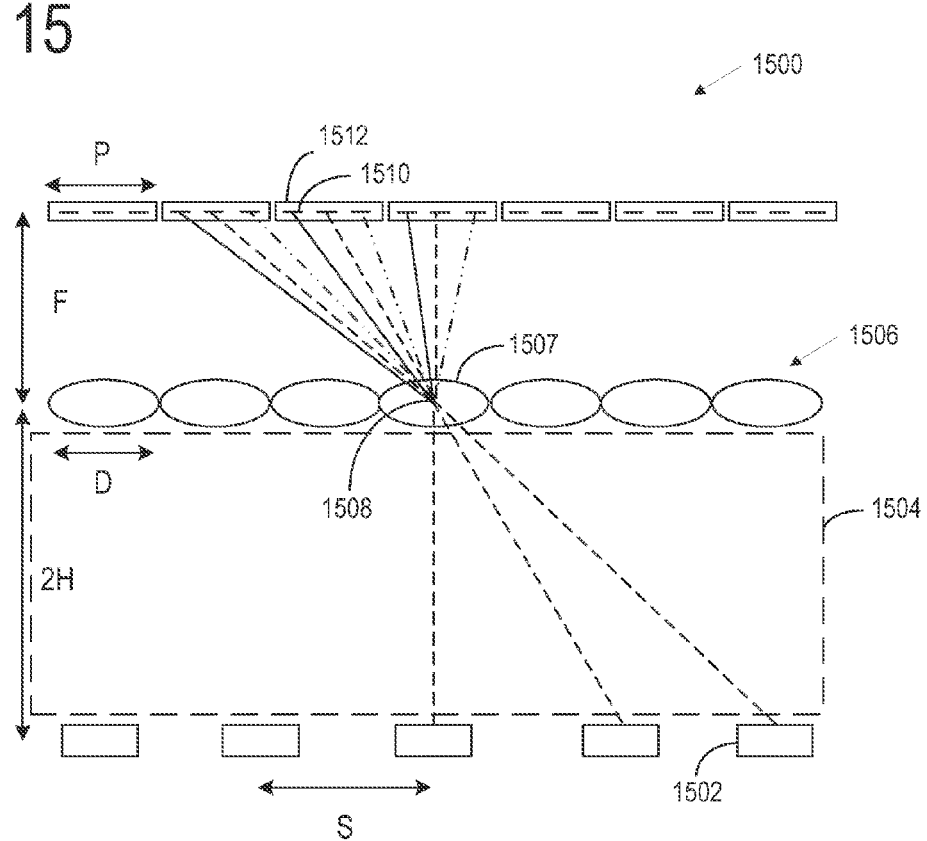
FIG. 15 shows a schematic depiction of an embodiment of a color filter matching backlight system.

In some embodiments, a backlight system according to the present disclosure may be used in conjunction with diffractive optics to separate white backlighting into colored light to be directed through color filters of an LCD panel. Such a system may be referred to as a color matching backlighting system. FIG. 15 shows a schematic depiction of an embodiment of such a color matching backlight system 1500. The color matching backlight system 1500 includes a plurality of light sources 1502 configured to direct light into an optical wedge 1504, such as an optical wedge having a linear rear reflector as described above. After emerging from the optical wedge 1504, light is directed through a diffracting lens array 1506 comprising a plurality of lenses 1507 and a diffraction grating, illustrated schematically for one lens 1507 as a location 1508 at which light is diffracted into colored bands (represented by different line formats in FIG. 15). The diffraction grating may be at any suitable location within or on the lens array 1506, and may be located in front of, behind, or within the lenses 1507 of the lens array 1506. Further, in some embodiments, the diffraction grating may be separate from the lens array 1506.

The diffracting lens array 1506 separates white light from each light source into constituent bands of color, and then directs the light through the color filters 1510 of the pixels 1512 of an LCD panel. FIG. 15 illustrates light from three light sources entering a single lens 1507/diffraction grating segment of the diffracting lens array 1506. This light is diffracted into colored bands (represented by different line formats in FIG. 15), and then is directed through color filters of three pixels of the LCD screen (illustrated as three sets of color filters).

Figure 16:
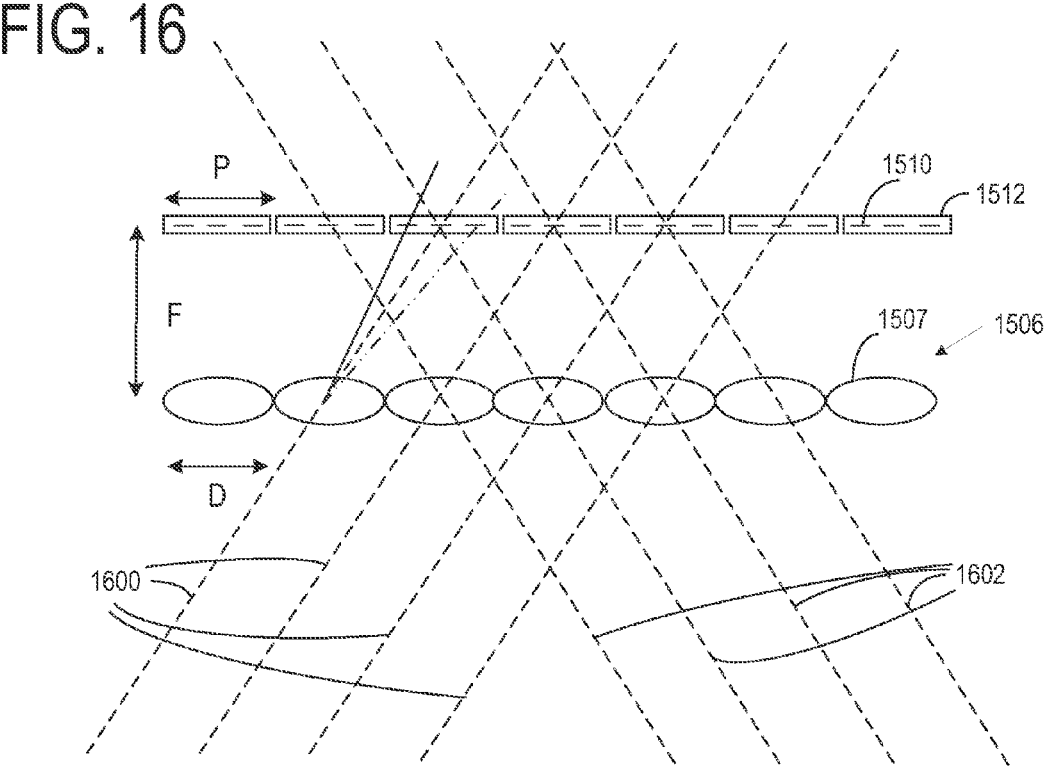
FIG. 16 shows a schematic depiction of light rays traveling through the embodiment of FIG. 15.
Figure 17:
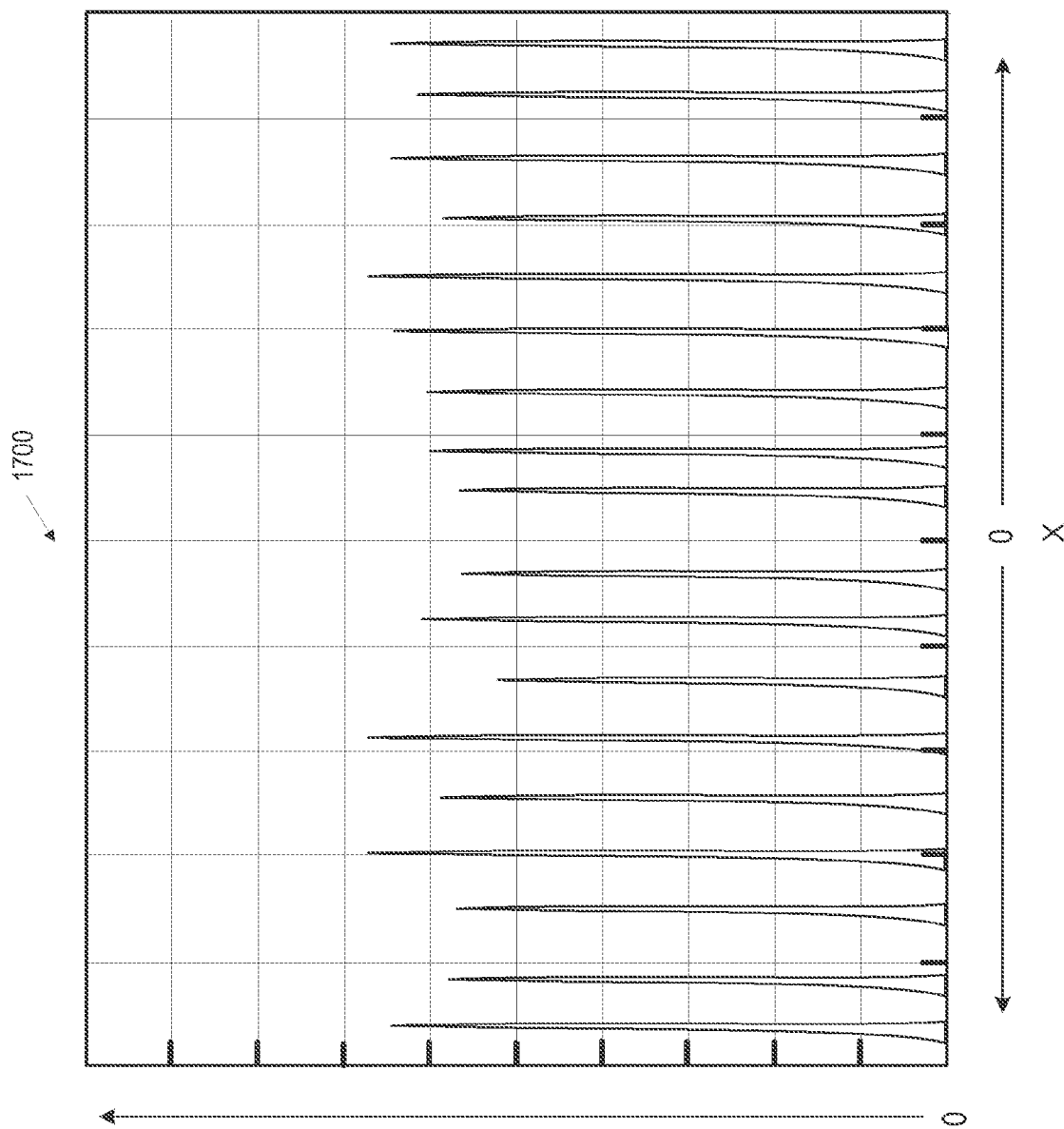
FIG. 17 shows a graph illustrating a modeling of intensity as a function of position for one color of light from the embodiment of FIG. 15.

Next, FIG. 16 illustrates that the diffracting lens array 1506 produces multiple images of each light source. Thus, the images of the different light sources may be made to overlap, thereby producing an acceptably uniform intensity across the LCD panel. In FIG. 16, rays from a first image source are illustrated at 1600, and rays from a second image source are illustrated at 1602. From FIG. 16, it can be seen that the image of the light source represented by rays 1600 and images of the light source represented by rays 1602 may be configured to overlap via selection of the pitch of the lens array and focal length of the lenses in the lens array. By diffracting this light and directing the resulting colors through the color filters of the LCD panel, color matching backlight system 1500 may increase light throughput relative to a backlight system that illuminates an LCD panel with white light, as less total light power is filtered by the LCD color filters due to the color matching. It will be understood that a diffuser may be placed over the LCD to form an image plane for viewing images produced by the LCD.

It is to be further understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A backlight system for a display panel, the backlight system comprising:
    a wedge-shaped light guide comprising a thin end opposite a thick end, the thick end of the wedge-shaped light guide comprising a cylindrical reflector with a plurality of reflecting facets, the cylindrical reflector being curved along a first direction extending between and connecting two opposing major faces at the thick end of the wedge-shaped light guide, and uncurved along a second direction extending between and connecting two opposing minor faces at the thick end of the wedge-shaped light guide;
    a plurality of light sources of first and second subsets arranged along the thin end of the wedge-shaped light guide, opposite the cylindrical reflector, wherein each light source of the first subset is configured to output light of a narrower emitter angle, and each light source of the second subset is configured to output light of a wider emitter angle, and wherein the light sources of the first subset and the light sources of the second subset are arranged in an alternating relation along the thin end of the wedge-shaped light guide; and
    a controller configured to switch between operating the backlight system in a narrow angle mode in which the first subset of light sources are in an on state and the second subset of light sources are in an off state, and operating the backlight system in a wide angle mode in which the second subset of light sources are in an on state.

2. The backlight system of claim 1, wherein the plurality of light sources is configured to be illuminated together.

3. The backlight system of claim 1, wherein a thickness ratio of the thin end to the thick end of the wedge-shaped light guide is 0.8:1.8, and wherein the plurality of reflecting facets have a height of 0.225 mm and an angle of 17.0 degrees with respect to an end plane of the light guide.

4. The backlight system of claim 1, further comprising a plurality of concentrators, wherein each concentrator is disposed optically between a corresponding light source and the wedge-shaped light guide.

5. The backlight system of claim 4, wherein one or more concentrators each comprises a cylindrical lens.

6. The backlight system of claim 4, wherein each concentrator is formed directly in the thin end of the light guide.

7. The display device of claim 4, wherein each light source of a first subset of light sources has a corresponding concentrator configured to emit light at a narrower emitter angle, and wherein each light source of a second subset of light sources is configured to emit light at a wider emitter angle.

8. The backlight system of claim 1, further comprising a diffraction grating configured to separate light emitted from the light guide into separate colors, and also further comprising a lens array configured to direct diffracted light through color filters of a liquid crystal display panel.

9. The backlight system of claim 1, further comprising a turning structure disposed on an exit surface of the wedge-shaped light guide and comprising a plurality of facets, wherein angles of the facets vary as a function of facet position.

10. The light guide of claim 1, wherein the wedge-shaped light guide comprises a non-planar exit surface.

11. The backlight system of claim 1, wherein the controller is further configured to switch to a high-brightness mode in which both the first and second subsets of light sources are on concurrently.

12. A display device, comprising:
    a modulating image display panel; and
    a backlight system configured to backlight the modulating image display panel, the backlight system comprising:
        a substantially wedge-shaped light guide comprising two opposing major faces extending between a thin end and a thick end of the substantially wedge-shaped light guide, the thick end comprising a cylindrical reflector with a plurality of facets, the cylindrical reflector being curved along a first direction extending between and connecting the two opposing major faces and uncurved in a second direction extending between and connecting two opposing minor faces of the wedge-shaped light guide;
        a plurality of light sources arranged along the thin end of the backlight system and configured to be illuminated together, the plurality of light sources comprising alternating narrow-angle light sources configured to output light of a narrower emitter angle and wide-angle light sources configured to output light of a wider emitter angle;
        a controller configured to switch between operating the backlight system in a narrow angle mode in which the narrow-angle light sources are in an on state and the wide-angle light sources are in an off state, and operating the backlight system in a wide angle mode in which the wide-angle light sources are in an on state; and
        a turning structure disposed on an exit surface of the light guide to redirect light emitted from the exit surface, the turning structure comprising a plurality of facets, with a thickness between the two opposing major faces varying as a function of distance across the light guide to provide a flat power distribution of the light exiting the backlight system.

13. The display device of claim 12, wherein the thin end and the thick end of the wedge-shaped light guide have a thickness ratio of 0.8:1.8, and wherein the plurality of facets of the cylindrical reflector have a height of 0.225 mm and an angle of 17.0 degrees with respect to a plane of the reflector.

14. The display device of claim 12, further comprising a plurality of concentrators, wherein each concentrator is disposed optically between a corresponding light source and the wedge-shaped light guide.

15. The display device of claim 12, wherein the plurality of light sources are configured to emit light having an angular distribution with a full-width half-maximum of between 40 and 80 degrees.

16. A method of operating a backlit display device, comprising:
- illuminating a first plurality of light sources to inject light into a thin end of a wedge-shaped light guide at a plurality of locations arranged in an alternating relation with a second plurality of light sources along the thin end of the wedge-shaped light guide;
- internally reflecting the light via a cylindrical reflector disposed at a thick end of the wedge-shaped light guide opposite the thin end where the first plurality of light sources inject light, the cylindrical reflector being curved along a first direction extending between and connecting two opposing major faces at the thick end of the wedge-shaped light guide and uncurved along a second dimension extending between and connecting two opposing minor faces of the wedge-shaped light guide;
- emitting the light from the wedge-shaped light guide;
- directing the light emitted from the wedge-shaped light guide through a modulating display panel to produce a displayed image;
- pursuant to a triggering event, operating the backlit display device in a wide angle mode in which the first plurality of light sources are off and the second plurality of light sources are on, where light from each of the second plurality of light sources is injected to the wedge-shaped light guide with a wider angular intensity distribution than light from each of the first plurality of light sources.

17. The method of claim 16, further comprising directing light from each of the first plurality of light sources through a concentrator before injecting the light into the wedge-shaped light guide.

* * * * *